(12) United States Patent
Chiba et al.

(10) Patent No.: US 12,330,481 B2
(45) Date of Patent: Jun. 17, 2025

(54) LAMINATED GLASS

(71) Applicant: NIPPON SHEET GLASS COMPANY, LIMITED, Tokyo (JP)

(72) Inventors: Kazuki Chiba, Tokyo (JP); Hisashi Ogawa, Tokyo (JP); Hisashi Asaoka, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/911,108

(22) PCT Filed: Mar. 12, 2021

(86) PCT No.: PCT/JP2021/010238
§ 371 (c)(1),
(2) Date: Sep. 12, 2022

(87) PCT Pub. No.: WO2021/182641
PCT Pub. Date: Sep. 16, 2021

(65) Prior Publication Data
US 2023/0121323 A1 Apr. 20, 2023

(30) Foreign Application Priority Data
Mar. 13, 2020 (JP) .................. 2020-044833

(51) Int. Cl.
*B32B 17/10* (2006.01)
*B32B 3/18* (2006.01)
(Continued)

(52) U.S. Cl.
CPC *B60J 1/02* (2013.01); *B32B 3/18* (2013.01); *B32B 3/30* (2013.01); *B32B 7/02* (2013.01);
(Continued)

(58) Field of Classification Search
CPC .... B60J 1/02; B60J 3/007; B32B 3/18; B32B 3/30; B32B 7/02; B32B 17/10036;
(Continued)

(56) References Cited

U.S. PATENT DOCUMENTS

2004/0160688 A1 8/2004 Noguchi et al.
2006/0250711 A1 11/2006 Noguchi et al.
(Continued)

FOREIGN PATENT DOCUMENTS

JP 2006096331 A * 4/2006 ......... B32B 17/1066
JP 2017-149604 A 8/2017
(Continued)

OTHER PUBLICATIONS

Translation of KR 20200079287. (Year: 2020).*
(Continued)

*Primary Examiner* — Megha M Gaitonde
(74) *Attorney, Agent, or Firm* — Birch, Stewart, Kolasch & Birch, LLP

(57) ABSTRACT

The present invention is a windshield on which an information acquisition device that acquires information from outside of a vehicle by emitting and/or receiving light can be arranged, the windshield including: an outer glass plate; an inner glass plate; an interlayer film arranged between the outer glass plate and the inner glass plate; and a mask layer laminated on at least one of a surface on a vehicle interior side of the outer glass plate and a surface on a vehicle exterior side of the inner glass plate, in which the interlayer film includes a colored shade region, a transparent non-shade region, and a transparent sheet member that is fitted into at least one through hole formed over the shade region and the non-shade region.

22 Claims, 13 Drawing Sheets

(51) Int. Cl.
  *B32B 3/30* (2006.01)
  *B32B 7/02* (2019.01)
  *B60J 1/02* (2006.01)
  *B60J 3/00* (2006.01)
  *B32B 27/08* (2006.01)
  *B32B 27/30* (2006.01)

(52) U.S. Cl.
  CPC ......... *B32B 17/10036* (2013.01); *B60J 3/007* (2013.01); *B32B 17/10761* (2013.01); *B32B 27/08* (2013.01); *B32B 27/306* (2013.01); *B32B 2307/212* (2013.01); *B32B 2307/402* (2013.01); *B32B 2307/412* (2013.01); *B32B 2307/54* (2013.01); *B32B 2307/732* (2013.01); *B32B 2605/00* (2013.01)

(58) Field of Classification Search
  CPC . B32B 17/10761; B32B 27/08; B32B 27/306; B32B 2307/212; B32B 2307/402; B32B 2307/412; B32B 2307/54; B32B 2307/732; B32B 2605/00; Y10T 428/24479; Y10T 428/24612; Y10T 428/24942; Y10T 428/2495; Y10T 428/24959
  USPC .......................... 428/156, 172, 212, 213, 214
  See application file for complete search history.

(56) References Cited

U.S. PATENT DOCUMENTS

| 2017/0239918 | A1 | 8/2017 | Nakamura |
| 2020/0391577 | A1 | 12/2020 | Bard et al. |
| 2021/0039358 | A1* | 2/2021 | Mannheim Astete ............... B32B 17/10174 |

FOREIGN PATENT DOCUMENTS

| JP | 2018-020771 | * | 2/2018 | |
| JP | 2018-20771 A | | 2/2018 | |
| KR | 20200079287 A | * | 7/2020 | |
| WO | WO 03/059837 A1 | | 7/2003 | |
| WO | WO-2015170771 A1 | * | 11/2015 | ....... B32B 17/10036 |
| WO | WO 2019/147605 A1 | | 8/2019 | |
| WO | WO-2019180651 A1 | * | 9/2019 | ....... B32B 17/10036 |

OTHER PUBLICATIONS

Translation of WO 2015/170771. (Year: 2015).*
Machine translation of JP 2006-096331. (Year: 2006).*
International Search Report for PCT/JP2021/010238 (PCT/ISA/210) mailed on May 25, 2021.
Written Opinion of the International Searching Authority for PCT/JP2021/010238 (PCT/ISA/237) mailed on May 25, 2021.
Extended European Search Report for European Application No. 21768943.9, dated Mar. 25, 2024.

* cited by examiner

LAMINATED GLASS

TECHNICAL FIELD

The present invention relates to a laminated glass on which an information acquisition device that acquires information from outside of a vehicle by emitting and/or receiving light can be arranged.

BACKGROUND ART

In some cases, in order to improve anti-glare and heat shielding properties, a band-shaped shade region colored green, blue, or the like is formed in a laminated glass for a vehicle, and in particular, a windshield, in which an interlayer film is arranged between a pair of glass plates. The shade region is provided on the surface of the glass plate in some cases, but is often formed by coloring part of the interlayer film in a band shape. On the other hand, since a windshield has a statutory field-of-view region in which the visible light transmittance should be a predetermined value or more (e.g., 70% or more), the shade region of the windshield is arranged outside of the field-of-view region, that is, normally at an upper portion of the windshield.

Incidentally, in recent years, the safety performance of automobiles has been improving dramatically, and as one of these improvements, a safety system has been proposed in which a distance to a vehicle in front and a speed of the vehicle in front are detected and a brake is automatically operated when an abnormal approach occurs, in order to avoid a collision with the vehicle in front. In such a system, a device such as a laser radar, a camera, or the like is used to measure the distance to the vehicle in front and the like using a laser, infrared rays, or the like. Also, in general, it is desired that these devices are attached to the upper portion of the windshield in order to ensure safety and sufficiently exhibit the functions of the devices.

However, since the shade region is formed at the upper portion of the windshield as described above, it is necessary to form an opening through which the light of a camera or the like can pass in the shade region, in order to attach a device such as a laser radar. In view of this, for example, Patent Literature 1 discloses the following method.

That is, in Patent Literature 1, a through hole is formed in the shade region, and a transparent sheet member is fitted into the through hole, whereby the camera can capture an image of the outside of the vehicle through the sheet member.

CITATION LIST

Patent Literature

Patent Literature 1: International Publication No. 2003/059837

SUMMARY OF INVENTION

Technical Problem

Incidentally, since the sheet member and the shade region are different members, it is very difficult to make them exactly the same thickness, and if there is a difference in thickness, there is a risk that a level difference will occur at the boundary between the sheet member and the shade area. In this case, the inventor of the present invention has found that in some cases, the glass plates sandwiching the interlayer film bend along the sheet member instead of coming into contact with the interlayer film so as to flatten the level difference. For this reason, the inventor of the present invention found that a gap may be formed between the glass plate and the interlayer film at the location where the above-mentioned level difference occurs, and as a result, air may accumulate at the level difference at the time of manufacturing the laminated glass. For this reason, from the vehicle interior side or the vehicle exterior side of the laminated glass, the air accumulated at the level difference looks like a bubble, and there is a risk that the appearance will deteriorate. This point is not limited to a windshield, but is a problem that can occur in other laminated glasses as well.

The present invention has been made to solve the above-described problem, and aims to provide a laminated glass according to which deterioration of the appearance due to the occurrence of bubbles or the like can be suppressed even if the thicknesses of the sheet member and the shade region (or a later-described non-shade region) are different in the interlayer film.

Solution to Problem

Item 1. A laminated glass on which an information acquisition device for acquiring information from outside of a vehicle by emitting and/or receiving light is arrangeable, the laminated glass including:
  an outer glass plate;
  an inner glass plate;
  an interlayer film arranged between the outer glass plate and the inner glass plate; and
  a mask layer laminated on at least one of a surface on a vehicle interior side of the outer glass plate or a surface on a vehicle interior side of the inner glass plate,
  in which the interlayer film includes:
    a colored shade region;
    a transparent non-shade region; and
    a transparent sheet member fitted into at least one through hole formed over the shade region and the non-shade region,
  the mask layer includes at least one opening that is formed on an inner side relative to an edge portion of the sheet member at a position corresponding to the sheet member,
  the light of the information acquisition device passes through the opening,
  when a thickness of the laminated glass at a central point of the sheet member is defined as H1, a thickness of the laminated glass at a point that is 400 mm away from the edge portion of the sheet member on a virtual line extending in a horizontal direction through the central point is defined as H2, and
  any point A on an inner edge of the opening, a point B that is the shortest distance from the point A on an outer edge of the sheet member, and a point C at which a virtual line extending from the point A through the point B and an outer edge of the mask layer intersect each other,
  a distance between the point A and the point B is defined as S1, and a distance between the point B and the point C is defined as S2,
  when H1 is greater than H2, S1 is smaller than S2 at a location where S1+S2 is minimized, and
  when H1 is less than H2, S1 is greater than S2 at a location where S1+S2 is minimized.

Item 2. The laminated glass according to item 1,
in which when H1 is greater than H2, the distance S2 is 5 to 50 mm.

Item 3. The laminated glass according to item 1,
in which when H1 is less than H2, the distance S1 is 5 to 50 mm.

Item 4. The laminated glass according to item 2 or 3,
in which S1+S2 is 100 mm or less.

Item 5. The laminated glass according to any one of items 1 to 4,
in which a plurality of the openings are formed, and
when the shortest distance between the openings that are adjacent to each other is smaller than the sum of the S2 of the openings, the sheet members corresponding to the openings are formed integrally with each other.

Item 6. The laminated glass according to any one of items 1 to 5,
in which a mask material forming the mask layer and the glass plate have different thermal expansion rates,
the glass plate and the mask layer are formed by being heated together,
an opening peripheral edge region in which a percentage by which the mask layer is arranged per unit surface area is low is formed in at least a partial region along an inner peripheral edge of the opening of the mask layer, and
the light passes through a region on an inner side relative to the opening peripheral edge region.

Item 7. The laminated glass according to item 6,
in which the opening peripheral edge region is formed over the entirety of the inner peripheral edge of the opening.

Item 8. The laminated glass according to item 6 or 7,
in which an inner portion of the opening peripheral edge region of the laminated glass is constituted by a distortion region along an inner peripheral edge of the opening peripheral edge region and a central region adjacent to an inner side of the distortion region, and
the light passes through all or a portion of the central region.

Item 9. The laminated glass according to item 8, in which the width of the distortion region is 6 mm or less.

Item 10. The laminated glass according to any one of items 6 to 9,
in which the opening peripheral edge region includes a plurality of mask pieces made of the mask material, and
the plurality of mask pieces are arranged at intervals from each other.

Item 11. The laminated glass according to item 10,
in which each mask piece is formed in a circular shape.

Item 12. The laminated glass according to item 10 or 11,
in which the mask pieces are arranged in a staggered manner.

Item 13. The laminated glass according to any one of items 6 to 12,
in which at least a portion of the mask layer is black.

Item 14. The laminated glass according to any one of items 6 to 13,
in which an electromagnetic wave blocking film is formed in at least a portion of the region where the information acquisition device is attached in the mask layer, the opening peripheral edge region, and the distortion region.

Item 15. The laminated glass according to item 14,
in which at least a portion of the mask layer, the opening peripheral edge region, and the distortion region is formed by arranging a first field-of-view blocking film, the electromagnetic wave blocking film, and a second field-of-view blocking film in the stated order from a vehicle exterior side to a vehicle interior side.

Item 16. The laminated glass according to any one of items 1 to 15,
in which the sheet member is larger than a square with 100 mm sides, and is smaller than a square with 300 mm sides.

Item 17. The laminated glass according to any one of items 1 to 16,
in which the interlayer film is constituted by a plurality of layers.

Item 18. The laminated glass according to item 17,
in which the interlayer film includes at least a core layer and a pair of outer layers sandwiching the core layer, and
the Young's modulus of the core layer is 20 MPa or less at 20° C. and 100 Hz.

Item 19. The laminated glass according to any one of items 1 to 18,
in which two to four of the through holes are formed, and the sheet member is fitted into each of the through holes.

Item 20. The laminated glass according to any one of items 1 to 19,
in which a cross-section taken in a vertical direction is formed in a wedge shape.

Item 21. The laminated glass according to any one of items 1 to 20,
in which the thickness of the outer glass plate is less than the thickness of the inner glass plate.

Item 22. The laminated glass according to items 1 to 21, which is used as a windshield.

Item 22. The laminated glass according to items 1 to 22, which is used as a rear glass.

Advantageous Effects of the Invention

According to the present invention, it is possible to suppress deterioration of appearance caused by the occurrence of a bubble even if thicknesses of the sheet member and the shade region (or a later-described non-shade region) are different in the interlayer film.

DESCRIPTION OF EMBODIMENTS

Figure 1:
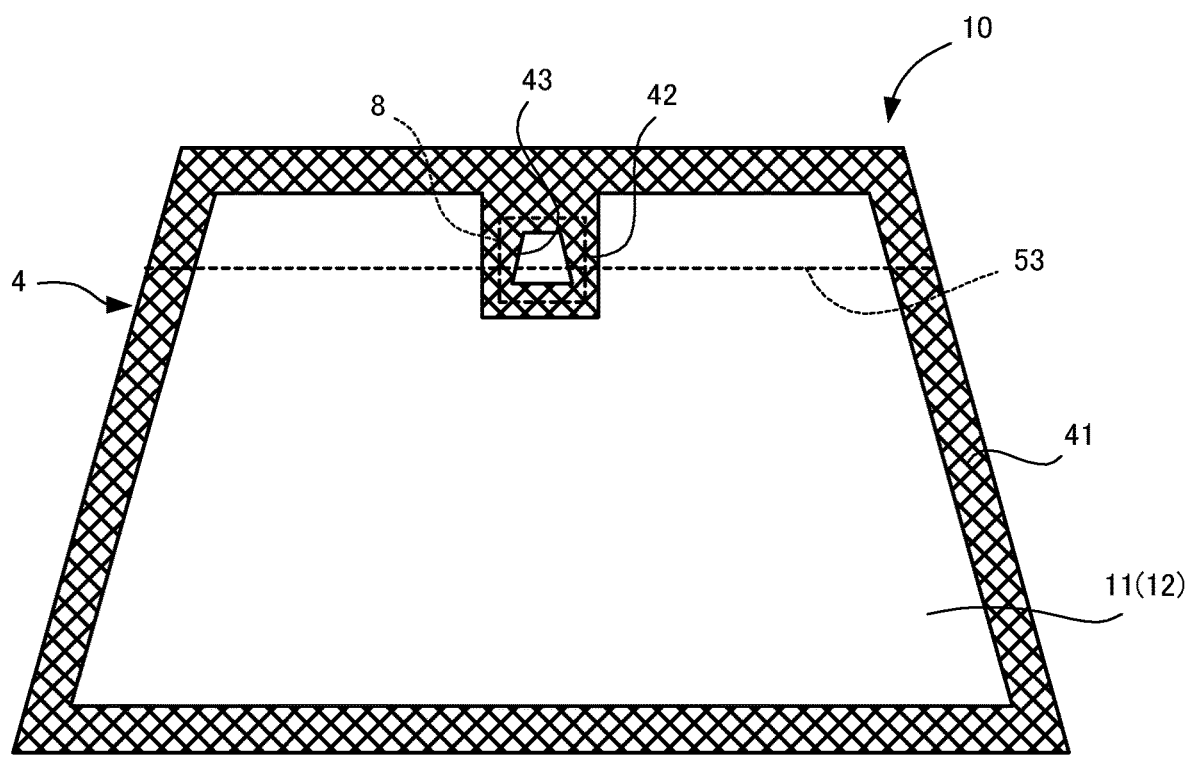
FIG. 1 is a plan view showing an embodiment of a laminated glass according to the present invention.
Figure 2:
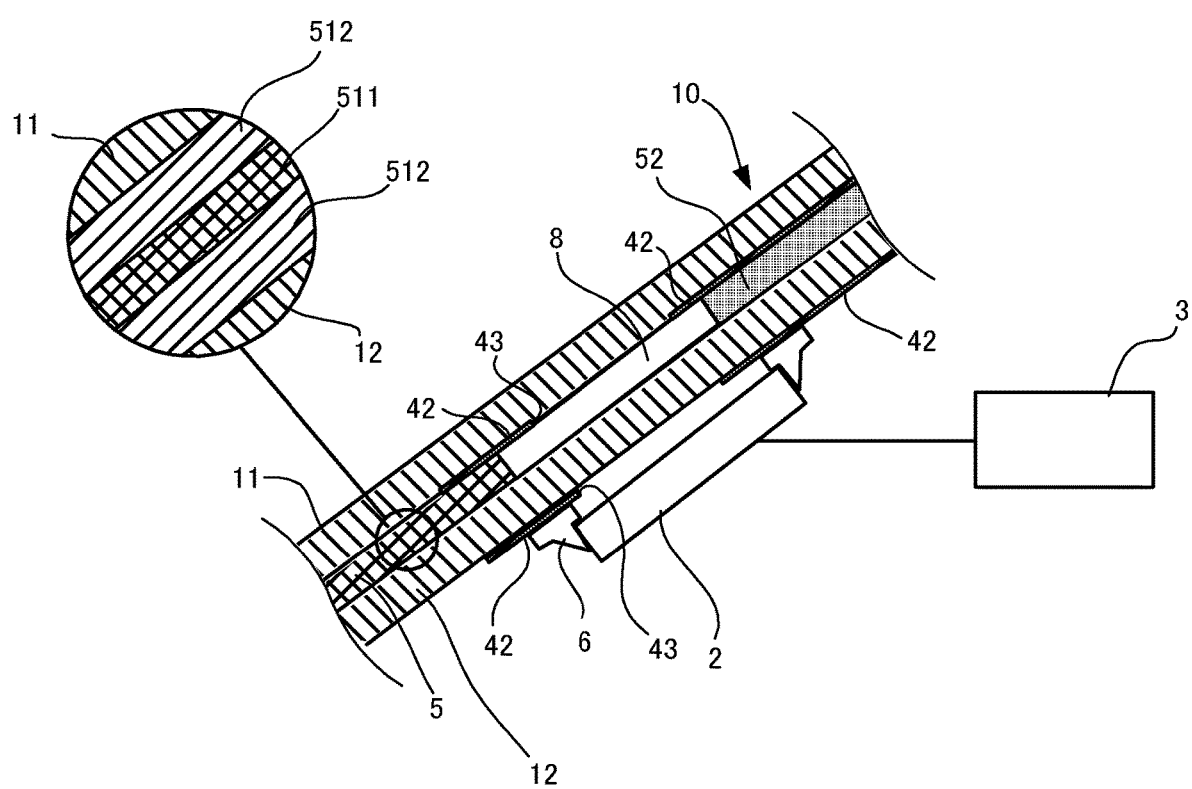
FIG. 2 is a cross-sectional view of FIG. 1.

Hereinafter, an embodiment in which the laminated glass according to the present invention is applied to a windshield will be described. First, a configuration of the windshield according to the present embodiment will be described with reference to FIGS. 1 and 2. FIG. 1 is a plan view of the windshield, and FIG. 2 is a cross-sectional view of FIG. 1. Note that for the sake of convenience of description, the up-down direction in FIG. 1 is referred to as "up-down" and "vertical", and the left-right direction in FIG. 1 is referred to as "left-right". FIG. 1 illustrates a windshield viewed from a vehicle interior side. That is, the far side from the sheet surface in FIG. 1 is the vehicle exterior side, and the near side from the sheet surface in FIG. 1 is the vehicle interior side.

This windshield includes a trapezoidal laminated glass 10 and is installed in a vehicle body in an inclined state. The laminated glass 10 has an outer glass plate 11, an inner glass plate 12, and an interlayer film 5 arranged between them. A mask layer 4 is laminated on the surface on the vehicle interior side of the outer glass plate 11 and the surface on the vehicle interior side of the inner glass plate 12, and the mask layer 4 blocks the field of view from the outside of the vehicle. Also, an opening 43 is formed in the mask layer 4, and an image capture device 2 arranged inside the vehicle can capture an image of the state outside the vehicle through the opening 43. That is, the opening 43 constitutes an image capture window. Furthermore, a frame-shaped bracket 6 is fixed on the mask layer 4 of the inner glass plate 12, and the image capture device 2 is attached to the bracket 6. Since the bracket 6 is formed in a frame shape and fixed on the mask layer 4, the bracket 6 cannot be seen from the outside of the vehicle. Hereinafter, each constituent element will be described in detail.

1. Laminated Glass

FIG. 2 is a cross-sectional view of the laminated glass. As shown in the drawing, the laminated glass 10 includes the outer glass plate 11 and the inner glass plate 12, and the resin interlayer film 5 is arranged between the glass plates 11 and 12. Hereinafter, these configurations will be described.

1-1. Glass Plates

First, the outer glass plate 11 and the inner glass plate 12 will be described. As the outer glass plate 11 and the inner glass plate 12, known glass plates can be used, and the outer glass plate 11 and the inner glass plate 12 can be made of heat ray absorbing glass, general clear glass or green glass, or UV green glass. However, these glass plates 11 and 12 need to realize visible light transmittance in accordance with a safety standard of the country in which the automobile is to be used. For example, the outer glass plate 11 can ensure a required solar absorptivity, and the inner glass plate 12 can adjust the visible light transmittance so as to satisfy a safety standard. Examples of clear glass, heat ray absorbing glass, and soda lime-based glass are shown below.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R is an alkali metal)
Total iron oxide converted to $Fe_2O_3$ (T-$Fe_2O_3$): 0.08 to 0.14 mass %

Heat Ray Absorbing Glass

The composition of the heat ray absorbing glass can be, for example, using the composition of clear glass as a reference, a composition in which the percentage of total iron oxide (T-$Fe_2O_3$) converted to $Fe_2O_3$ is 0.4 to 1.3 mass %, the percentage of $CeO_2$ is 0 to 2 mass %, the percentage of $TiO_2$ is 0 to 0.5 mass %, and the skeleton components of glass (mainly $SiO_2$ and $Al_2O_3$) have been reduced by the amount by which T-$Fe_2O_3$, $CeO_2$, and $TiO_2$ increase.

Soda Lime Glass
$SiO_2$: 65 to 80 mass %
$Al_2O_3$: 0 to 5 mass %
CaO: 5 to 15 mass %
MgO: 2 mass % or more
NaO: 10 to 18 mass %
$K_2O$: 0 to 5 mass %
MgO+CaO: 5 to 15 mass %
$Na_2O$+$K_2O$: 10 to 20 mass %
$SO_3$: 0.05 to 0.3 mass %
$B_2O_3$: 0 to 5 mass %
Total iron oxide converted to $Fe_2O_3$ (T-$Fe_2O_3$): 0.02 to 0.03 mass %

Although the thickness of the laminated glass 10 according to the present embodiment is not particularly limited, the total thickness of the outer glass plate 11 and the inner glass plate 12 can be set to, for example, 2.1 to 6 mm, and from the viewpoint of weight reduction, the total thickness of the outer glass plate 11 and the inner glass plate 12 is preferably 2.4 to 3.8 mm, more preferably 2.6 to 3.4 mm, and particularly preferably 2.7 to 3.2 mm. As described above, in order to reduce the weight, it is necessary to reduce the total thickness of the outer glass plate 11 and the inner glass plate 12, and therefore, although the thickness of each glass plate is not particularly limited, for example, the thicknesses of the outer glass plate 11 and the inner glass plate 12 can be determined as follows.

The outer glass plate 11 is mainly required to have durability and impact resistance against external obstacles, and as a windshield of an automobile, it is required to have impact resistance against flying objects such as pebbles. On the other hand, the greater the thickness is, the heavier the weight is, which is not preferable. From this viewpoint, the thickness of the outer glass plate 11 is preferably 1.8 to 2.3 mm, and more preferably 1.9 to 2.1 mm. The thickness to be used can be determined according to the application of the glass.

The thickness of the inner glass plate 12 can be made equal to that of the outer glass plate 11, but for example, the thickness can be made smaller than that of the outer glass plate 11 in order to reduce the weight of the laminated glass 10. Specifically, considering the strength of the glass, the thickness is preferably 0.6 to 2.0 mm, preferably 0.8 to 1.6 mm, and particularly preferably 1.0 to 1.4 mm. Also, the thickness is preferably 0.8 to 1.3 mm. As for the inner glass plate 12, the thickness to be used can be determined according to the application of the glass.

Here, an example of a method for measuring the thickness when the glass plate (laminated glass) 1 is curved will be described. First, the measurement positions are two points above and below a center line S extending in the vertical direction along the center of the glass plate in the left-right direction. Although there is no particular limitation on the measurement device, for example, a thickness gauge such as SM-112 manufactured by Teclock Corporation can be used. At the time of measurement, the curved surface of the glass plate is placed on a flat surface, and the edge of the glass plate is held by the thickness gauge and measurement is performed. Note that even if the glass plate is flat, measurement can be performed in the same manner as if the glass plate is curved.

1-2. Interlayer Film

Figure 3:
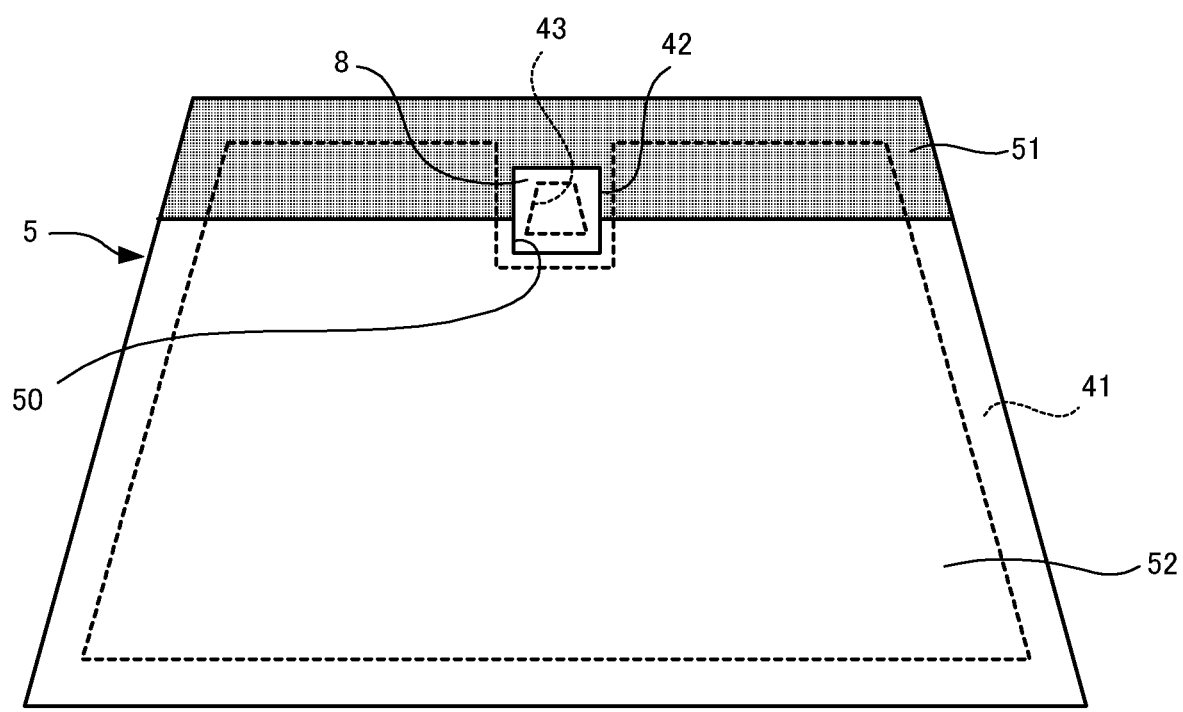
FIG. 3 is a plan view of an interlayer film.

FIG. 3 is a plan view of the interlayer film. As shown in FIG. 3, the interlayer film 5 is formed to have the same size as the glass plates 11 and 12, and includes a band-shaped shade region 51 forming the upper end portion of the interlayer film 5, a non-shade region 52 that is connected to the lower end portion of the shade region 51 and occupies most of the interlayer film 5, and a sheet member 8 that is arranged between the shade region 51 and the non-shade region 52.

The shade region 51 is a region having a high transmittance loss for visible light, and is colored, for example, black, green, blue, or the like. The shade region 51 performs various functions (anti-glare, heat-shielding, etc.) that accompany dimming. On the other hand, the non-shade region 52 is an uncolored and transparent region.

The interlayer film 5 is made of at least one layer in both the shade region 51 and the non-shade region 52, and as an example of the non-shade region 52, as shown in the enlarged diagram of FIG. 2, a soft core layer 521 can be made of three layers sandwiched between outer layers 522, which are harder than the soft core layer 521. However, the present invention is not limited to this configuration, and may be made of a plurality of layers including the core layer 521 and at least one outer layer 522 arranged on the outer glass plate 11 side. For example, a two-layer interlayer film 5 including the core layer 521 and one outer layer 522 arranged on the outer glass plate 11 side, or an interlayer film 5 in which an even number of two or more outer layers 522 are respectively arranged on both sides centered about the core layer 521, or an interlayer film 5 in which an odd number of outer layers 522 are arranged on one side of the core layer 521 and an even number of outer layers 522 are arranged on the other side of the core layer 521. Note that if only one outer layer 522 is provided, the outer layer 522 is provided on the outer glass plate 11 side as described above, but this is for improving the damage resistance performance against an external force from outside of the vehicle or outdoors. Additionally, if there are a large number of outer layers 522, the sound insulation performance is also higher.

As long as the core layer 521 is softer than the outer layer 522, there is no particular limitation on the hardness of the core layer 521. There is no particular limitation on the material constituting the layers 521 and 522, but for example, the material can be selected based on the Young's modulus. Specifically, the Young's modulus of the core layer 521 is preferably 1 to 20 MPa, more preferably 1 to 18 MPa, and particularly preferably 1 to 14 MPa at a frequency of 100 Hz and a temperature of 20° C. Within such a range, it is possible to prevent the sound transmission loss (STL) from decreasing in a low frequency range of about 3500 Hz or less. On the other hand, the Young's modulus of the outer layer 522 is preferably large in order to improve the sound insulation performance in the high frequency range, as will be described later, and can be 560 MPa or more, 600 MPa or more, 650 MPa or more, 700 MPa or more, 750 MPa or more, 880 MPa or more, or 1300 MPa or more, at a frequency of 100 Hz and a temperature of 20 degrees. Although there is no particular limitation on the upper limit of the Young's modulus of the outer layer 522, the upper limit can be set from the viewpoint of workability, for example. For example, it is empirically known that when the upper limit is 1750 MPa or more, workability, and in particular, cutting, becomes difficult.

Also, as a specific material, the outer layer 522 can be made of, for example, polyvinyl butyral resin (PVB). Polyvinyl butyral resin is preferable because it has excellent adhesiveness with each glass plate and penetration resistance. On the other hand, the core layer 521 can be made of, for example, ethylene vinyl acetate resin (EVA) or a polyvinyl acetal resin softer than the polyvinyl butyral resin constituting the outer layer. By sandwiching the soft core layer therebetween, the sound insulation performance can be greatly improved while maintaining the same adhesiveness and penetration resistance as the single-layer resin interlayer film.

Generally, the hardness of a polyvinyl acetal resin can be controlled by (a) the degree of polymerization of polyvinyl alcohol, which is a starting material, (b) the degree of acetalization, (c) the type of plasticizer, (d) the addition ratio of the plasticizer, and the like. Accordingly, by appropriately adjusting at least one selected from these conditions, even if the same polyvinyl butyral resin is used, it is possible to create both the hard polyvinyl butyral resin used for the outer layer 522 and the soft polyvinyl butyral resin used for the core layer 521. Furthermore, the hardness of the polyvinyl acetal resin can also be controlled by the type of aldehyde used for acetalization, co-acetalization with a plurality of types of aldehydes, or pure acetalization with a single type of aldehyde. Although it cannot be said unconditionally, polyvinyl acetal resin obtained by using an aldehyde having a large number of carbon atoms tends to be softer. Accordingly, for example, if the outer layer 522 is constituted by polyvinyl butyral resin, a polyvinyl acetal resin obtained by acetalizing an aldehyde having 5 or more carbon atoms (e.g., n-hexyl aldehyde, 2-ethylbutyl aldehyde, n-heptyl aldehyde, n-octyl aldehyde) with polyvinyl alcohol can be used in the core layer 521. Note that if a predetermined Young's modulus can be obtained, there is no limitation to the above resins and the like.

The shade region 51 can also be constituted by the same layer configuration as the non-shade region 52, for example, a core layer and a pair of outer layers sandwiching the core layer. As described above, the shade region 51 is colored, but for example, any one or more of the core layer and the outer layers can be colored with a colorant such as a pigment or a dye. As the pigment, for example, an organic pigment that is azo-based, phthalocyanine-based, quinacridone-based, or the like, and inorganic pigments such as metal oxides and metal powders can be used.

If a pigment is used, the colored core layer and the uncolored transparent outer layers can be respectively produced using an extrusion molding method from a resin composition obtained by kneading the pigment together with a resin and a plasticizer and a resin composition containing no pigment (resin and plasticizer), and the colored shade region 51 can be obtained by performing molding by sandwiching the core layer between the outer layers. On the other hand, if a dye is used, a mask is used to expose a region of the interlayer film 5 on which the shade region 51 is to be formed, and the dye is applied to this region. The dye can be applied, for example, by spraying or printing.

Next, the sheet member 8 will be described. As shown in FIG. 3, a rectangular through hole 50 is formed in the center of the interlayer film 5 in the left-right direction so as to straddle the boundary between the shade region 51 and the non-shade region, and the above-described sheet member 8 is arranged on this through hole 50. That is, by combining a rectangular recessed portion formed at the lower end of the shade region 51 and the rectangular recessed portion formed near the center of the upper end portion of the non-shade region 52, the above-mentioned rectangular through hole 50 is formed. The sheet member 8 is made of a transparent material, can be constituted by one layer, or can be constituted by a plurality of layers similarly to the shade region 51 or the non-shade region 52. Also, if it is constituted by one layer, it can also be made of any material of the core layer or the outer layer described above.

The sheet member 8 is arranged at a position corresponding to the extending portion 42 of the mask layer 4, which will be described later, and the opening 43 formed in the extending portion 42 is located inside the sheet member 8. Accordingly, the seat member 8 is arranged inside the opening 43.

The total thickness of the interlayer film 5 is not particularly specified, but is preferably 0.3 to 6.0 mm, more preferably 0.5 to 4.0 mm, and particularly preferably 0.6 to 2.0 mm. The thickness of the core layer 521 is preferably 0.1 to 2.0 mm, and more preferably 0.1 to 0.6 mm. On the other hand, the thickness of each outer layer 522 is preferably 0.1 to 2.0 mm, and more preferably 0.1 to 1.0 mm. In addition, the thickness of the core layer 521 can be adjusted within these conditions with the total thickness of the interlayer film 5 kept constant.

The thickness of the core layer 521 and the outer layer 522 can be measured, for example, as follows. First, the cross section of the laminated glass is magnified 175 times and displayed by a microscope (e.g., VH-5500 manufactured by KEYENCE). Also, the thicknesses of the core layer 521 and the outer layer 522 are visually specified and measured. At this time, in order to eliminate variation due to eyesight, the number of instances of measurement is set to five, and the average value thereof is taken as the thickness of the core layer 521 and the outer layer 522. For example, an enlarged photograph of the cross section of the laminated glass is taken, and the core layer 521 and the outer layer 522 are specified therein and the thickness is measured.

Note that the thicknesses of the core layer 521 and the outer layer 522 of the interlayer film 5 do not need to be constant over the entire surface, and for example, can also be wedge-shaped for use in laminated glass to be used in a head-up display. In this case, the thickness of the core layer 521 and the outer layer 522 of the interlayer film 5 is measured at the thinnest portion, that is, the lowest edge portion of the laminated glass. If the interlayer film 5 has a wedge shape, the outer glass plate 11 and the inner glass plate 12 are not arranged in parallel, but such an arrangement is also assumed to be encompassed in the glass plate of the present invention. That is, the present invention includes, for example, the arrangement of the outer glass plate and the inner glass plate when the interlayer film 5 using the core layer 521 and the outer layers 522 whose thickness increases at a rate of change of 3 mm or less per meter is used.

Although there is no particular limitation on the method for producing the interlayer film 5, examples thereof include a method of blending a resin component such as the above-mentioned polyvinyl acetal resin, a plasticizer, and other additives as necessary, kneading them uniformly, and thereafter collectively performing extrusion molding on each layer, and a method of laminating two or more resin films produced by this method, through pressing, laminating, or the like. The unlaminated resin film used in the method of laminating through pressing, laminating, or the like may have a single-layer structure or a multi-layer structure. Also, the interlayer film 5 can be made of one layer instead of being made of a plurality of layers as described above. Then, after the through hole 50 as described above is formed, the sheet member 8 can be fitted therein.

2. Overview of Mask Layer

Next, the mask layer 4 will be described. As shown in FIGS. 1 and 2, the mask layer 4 is formed on both the surface on the vehicle interior side of the inner glass plate 12 and the inner surface of the outer glass plate 11. Since the mask layers 4 formed on the inner glass plate 12 and the outer glass plate 11 have the same shape and are laminated at the same position, the mask layer 4 laminated on the inner glass plate 12 will be described below.

The mask layer 4 includes a peripheral edge portion 41 laminated along the entirety of the peripheral edge of the inner glass plate 12, and a rectangular extended portion 42 that is connected to the peripheral edge portion 41 and extends downward from the vicinity of the center of the upper side of the inner glass plate 12. A trapezoidal opening 43 is formed at the lower end of the extended portion 42, and the image capture device 2 attached to the vehicle interior side can capture an image of the outside of the vehicle through the opening 43 and the laminated glass 10. Also, a boundary 53 between the shade region 51 and the non-shade region 52 of the interlayer film 5 described above extends in the horizontal direction so as to pass through the opening 43.

As shown in FIG. 2, the bracket 6 described above is fixed on the mask layer 4. Specifically, the bracket 6 is formed in a frame shape so as to surround the opening, and is fixed to the mask layer 4 with double-sided tape, an adhesive, or the like. Then, the image capture device 2 is supported by the bracket 6, and is configured to capture an image of the outside of the vehicle through the opening 43. Also, although not shown in the drawing, a cover is attached to the bracket 6 so that the image capture device 2 cannot be seen from the inside of the vehicle.

Next, the material of the mask layer 4 will be described. The material of the mask layer 4 may be selected as appropriate depending on the embodiment as long as it can shield the field of view from the outside of the vehicle, and for example, a ceramic in a dark color such as black, brown, gray, or navy blue may be used.

If black ceramic is selected as the material of the mask layer 4, for example, black ceramic is laminated on the inner surface of the inner glass plate 12 by screen printing or the like, and the laminated ceramic is heated together with the glass plates 11 and 12. When the ceramic is cured, the mask layer 4 is completed. Note that as the ceramic used for each mask layer 4, various materials can be used. For example, a ceramic having the compositions shown in Table 1 below can be used for the mask layer 4.

TABLE 1

|  |  | First and second colored ceramic paste |
|---|---|---|
| Pigment *1 | mass % | 10 |
| Resin (cellulose resin) | mass % | 10 |

TABLE 1-continued

| | | First and second colored ceramic paste |
|---|---|---|
| Organic solvent (pine oil) | mass % | 10 |
| Glass binder *2 | mass % | 70 |
| Viscosity | dPs | 150 |

*1, Main components: Copper oxide, chromium oxide, iron oxide and manganese oxide
*2, Main component: Bismuth borosilicate, zinc borosilicate

3. In-Vehicle System

Figure 4:
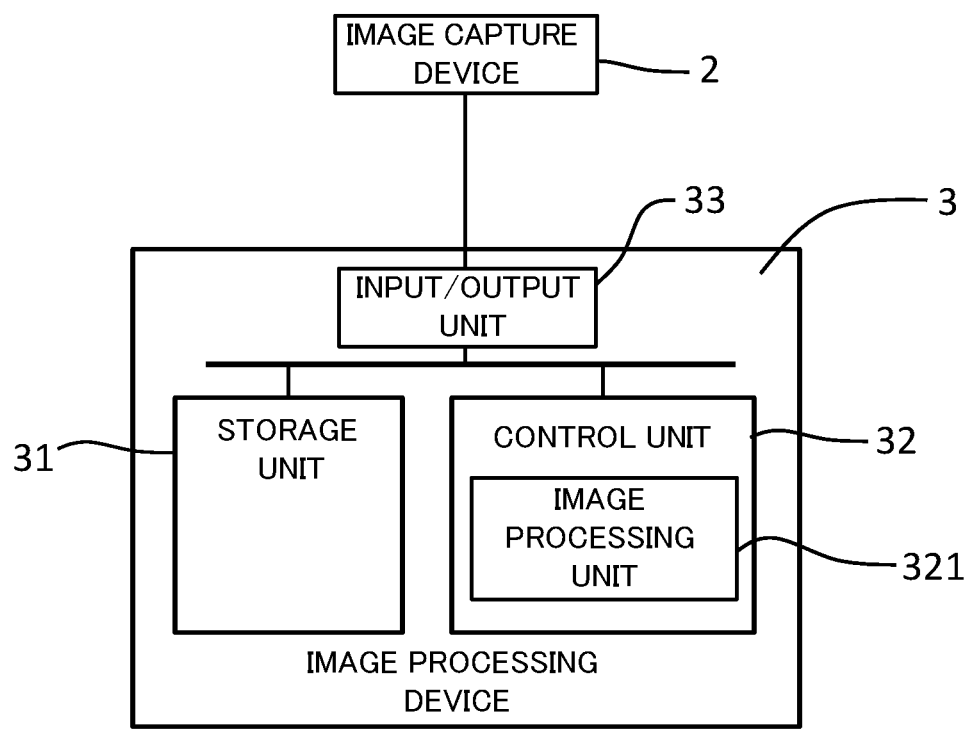
FIG. 4 is a block diagram showing a schematic configuration of an in-vehicle system.

Next, an in-vehicle system including an image capture device 2 and an image processing device 3 will be described with reference to FIGS. 2 and 4. FIG. 4 illustrates the configuration of the in-vehicle system. As illustrated in FIG. 4, the in-vehicle system according to the present embodiment includes the above-described image capture device 2 and the image processing device 3 connected to the image capture device 2.

The image processing device 3 is a device that processes the captured image acquired by the image capture device 2. The image processing device 3 has, for example, general hardware such as a storage unit 31, a control unit 32, and an input/output unit 33, which are connected by a bus, as a hardware configuration. However, the hardware configuration of the image processing device 3 does not need to be limited to such an example, and with respect to the specific hardware configuration of the image processing device 3, constituent elements can be added or omitted as appropriate according to the embodiment.

The storage unit 31 stores various data and programs used in the processing executed by the control unit 32 (not shown). The storage unit 31 may be realized by, for example, a hard disk or a recording medium such as a USB memory. Also, the various data and programs stored in the storage unit 31 may be acquired from a recording medium such as a CD (Compact Disc) or a DVD (Digital Versatile Disc). Furthermore, the storage unit 31 may be referred to as an auxiliary storage device.

As described above, the laminated glass 10 is arranged in an inclined posture with respect to the vertical direction and is curved. Then, the image capture device 2 captures an image of the state outside of the vehicle through such a laminated glass 10. For this reason, the captured image acquired by the image capture device 2 is deformed according to the posture, shape, refractive index, optical defect, and the like of the laminated glass 10. An aberration unique to the camera lens of the image capture device 2 is also added. In view of this, the storage unit 31 may store correction data for correcting an image deformed by the laminated glass 10 and the aberration of the camera lens.

The control unit 32 includes one or more processors such as a microprocessor or a CPU (Central Processing Unit), and peripheral circuits (ROM (Read Only Memory), RAM (Random Access Memory), interface circuits, etc.) used for processing of this processor. The ROM, RAM, and the like may also be referred to as a main storage device in the sense that they are arranged in the address space handled by the processor in the control unit 32. The control unit 32 functions as an image processing unit 321 by executing various data and programs stored in the storage unit 31.

The image processing unit 321 processes the captured image acquired by the image capture device 2. The processing of the captured image can be selected as appropriate according to the embodiment. For example, the image processing unit 321 may recognize the subject appearing in the captured image by analyzing the captured image through pattern matching or the like. In the present embodiment, since the image capture device 2 captures an image of the state in front of the vehicle, the image processing unit 321 may further determine whether or not an organism such as a human being has appeared in front of the vehicle based on subject recognition. Then, if a person appears in front of the vehicle, the image processing unit 321 may output a warning message using a predetermined method. Also, for example, the image processing unit 321 may carry out predetermined processing on the captured image. Then, the image processing unit 321 may output the processed captured image to a display device (not shown) such as a display connected to the image processing device 3.

The input/output unit 33 is one or a plurality of interfaces for transmitting/receiving data to/from a device that is outside of the image processing device 3. The input/output unit 33 is, for example, an interface for connecting to a user interface or an interface such as USB (Universal Serial Bus). Note that in the present embodiment, the image processing device 3 is connected to the image capture device 2 via the input/output unit 33, and acquires a captured image captured by the image capture device 2.

As such an image processing device 3, a general-purpose device such as a PC (Personal Computer) or a tablet terminal may be used in addition to a device designed exclusively for the service to be provided.

Also, the image capture device 2 is attached to the bracket 6 as described above. Accordingly, in this state, the attachment of the image capture device 2 to the bracket 6 and the attachment of the bracket to the mask layer 4 are adjusted such that the optical axis of the camera lens of the image capture device 2 passes through the opening 43. Also, a cover (not shown) is attached to the bracket 6 so as to cover the image capture device 2. Accordingly, the image capture device 2 is arranged in the space surrounded by the laminated glass 10, the bracket 6, and the cover so that it cannot be seen from the vehicle interior side, and so that only a portion of the image capture device 2 can be seen through the opening 43 by the mask layer 4 from the vehicle exterior side as well. Also, the image capture device 2 and the above-mentioned input/output unit 33 are connected by a cable (not shown), and this cable is pulled out from the cover and connected to the image processing device 3 arranged at a predetermined position in the vehicle.

4. Method for Manufacturing Windshield

Next, a method for manufacturing the windshield will be described. First, the mask layer 4 is laminated on the outer glass plate 11 and the inner glass plate 12 formed in a predetermined shape. Next, these glass plates 11 and 12 are formed so as to be curved. This method is not particularly limited, but can be performed through, for example, known press-forming. Alternatively, after the outer glass plate 11 and the inner glass plate 12 are placed on top of each other on the molding die, the molding die is passed through a heating furnace to be heated. As a result, these glass plates 11 and 12 can be curved by their own weight.

When the outer glass plate 11 and the inner glass plate 12 are formed in this manner, a laminate in which the interlayer film 5 is sandwiched between the outer glass plate 11 and the inner glass plate 12 is subsequently formed. Note that the interlayer film 5 has a shape larger than that of the glass plates 11 and 12.

Next, this laminate is placed in a rubber bag and pre-adhered at about 70 to 110° C. while being suctioned under reduced pressure. The method of pre-adhesion can be other than this, and the following method can also be adopted. For example, the above-described laminate is heated in an oven at 45 to 65° C. Next, the laminate is pressed by a roll at 0.45 to 0.55 MPa. Subsequently, the laminate is heated again in the oven at 80 to 105° C., and then pressed again with a roll at 0.45 to 0.55 MPa. In this manner, the pre-adhesion is completed.

Next, the main adhesion is performed. The pre-adhered laminate is subjected to main adhesion by an autoclave, for example, at 8 to 15 atm and at 100 to 150° C. Specifically, for example, the main adhesion can be performed at 14 atm under the condition of 135° C. Through the above-described pre-adhesion and main adhesion, the interlayer film 5 is adhered to the glass plates 11 and 12. Subsequently, the interlayer film 5 protruding from the outer glass plate 11 and the inner glass plate 12 is cut.

5. Influence on Thickness of Laminated Glass of Sheet Member

Figure 5:
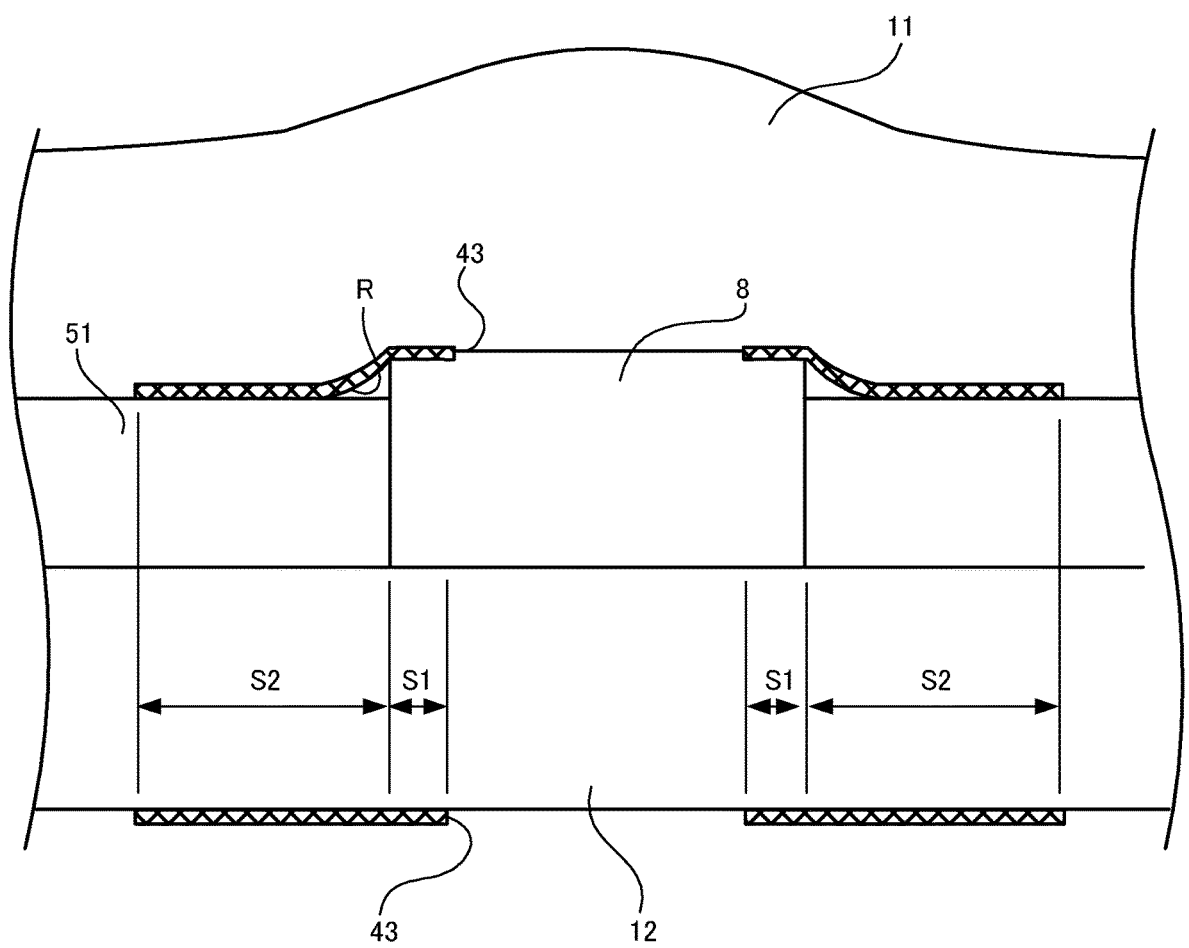
FIG. 5 is a cross-sectional view taken along line X-X of FIG. 6.
Figure 6:
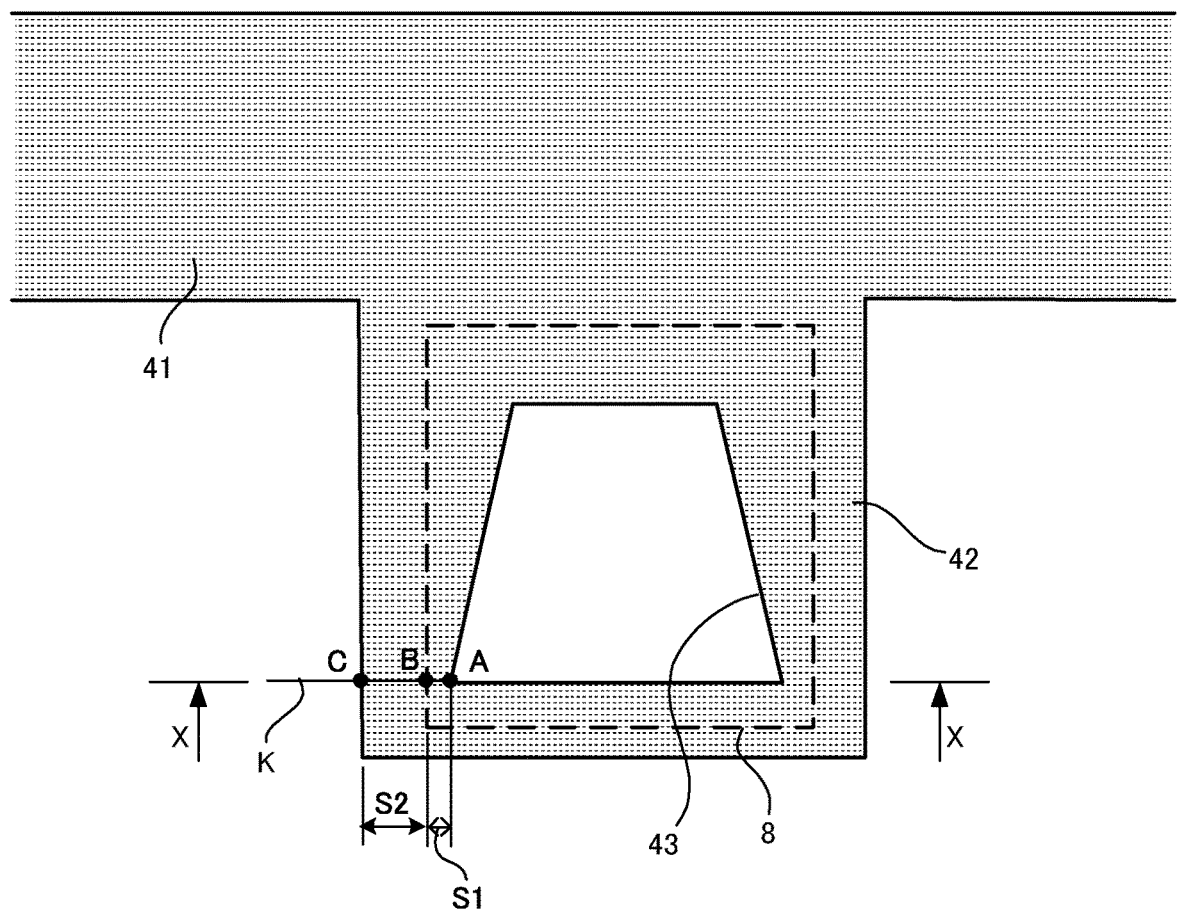
FIG. 6 is a partial plan view of a laminated glass.
Figure 7:
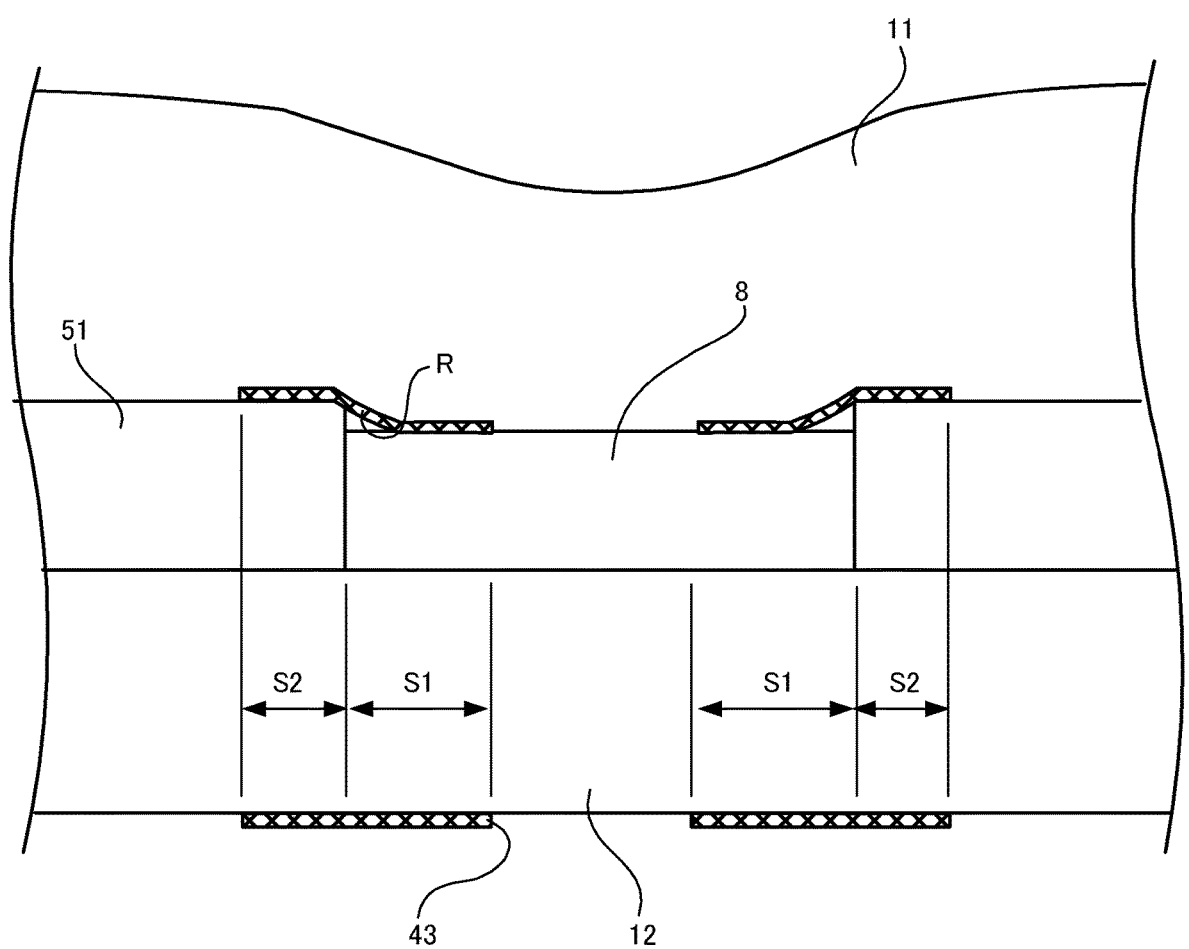
FIG. 7 is a cross-sectional view taken along line Y-Y of FIG. 8.
Figure 8:
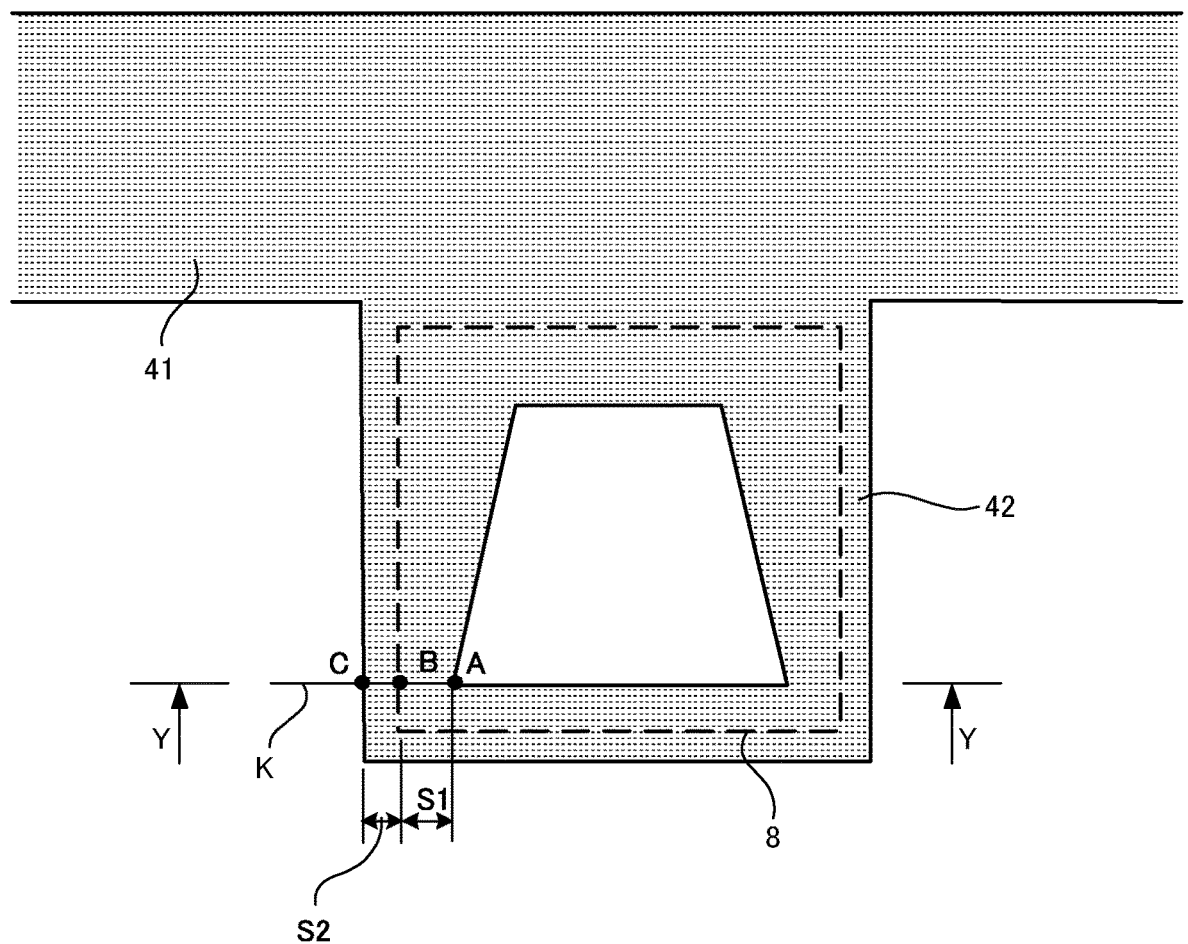
FIG. 8 is a partial plan view of the laminated glass.

Although the sheet member 8 basically has the same thickness as the shade region 51 and the non-shade region 52, it has been found by the inventor of the present invention that, for example, if the thickness of the sheet member 8 is different from the thickness of the shade region 51 and the non-shade region 52, this affects the thickness of the laminated glass 10. This point will be described with reference to FIGS. 5 to 9. FIG. 5 is a cross-sectional view taken along line X-X of FIG. 6, FIG. 6 is a partial plan view of the laminated glass, FIG. 7 is a cross-sectional view taken along line Y-Y of FIG. 8, FIG. 8 is a partial plan view of the laminated glass, and FIG. 9 is a partial plan view of the laminated glass.

For example, as shown in FIG. 5, it has been found that if the thickness of the sheet member 8 is larger than the thickness of the shade region 51 and the non-shade region 52, that is, if a level difference occurs due to the difference in thickness, the sheet member 8 forms a protruding portion on the surface of the interlayer film 5, the outer glass plate 11 does not come into contact with the interlayer film 5 so as to flatten the protruding portion, the outer glass plate 11 curves along the protruding portion, and the thickness becomes greater than that of the other portions. Note that although the example of FIG. 5 shows an example in which the sheet member 8 protrudes to the outer glass plate 11 side, it is also conceivable that the sheet member 8 protrudes toward the inner glass plate 12 or protrudes toward both glass plates 11 and 12.

In this case, since a level difference occurs at the boundary between the sheet member 8 and the shade region 51, there is a possibility that a gap R in which air accumulates will be formed between the outer glass plate 11 and the interlayer film 5 when the laminated glass 10 is manufactured. In this manner, when air enters the level difference, there is a risk that the appearance will deteriorate, and therefore, in the present embodiment, the following is specified.

Figure 9:
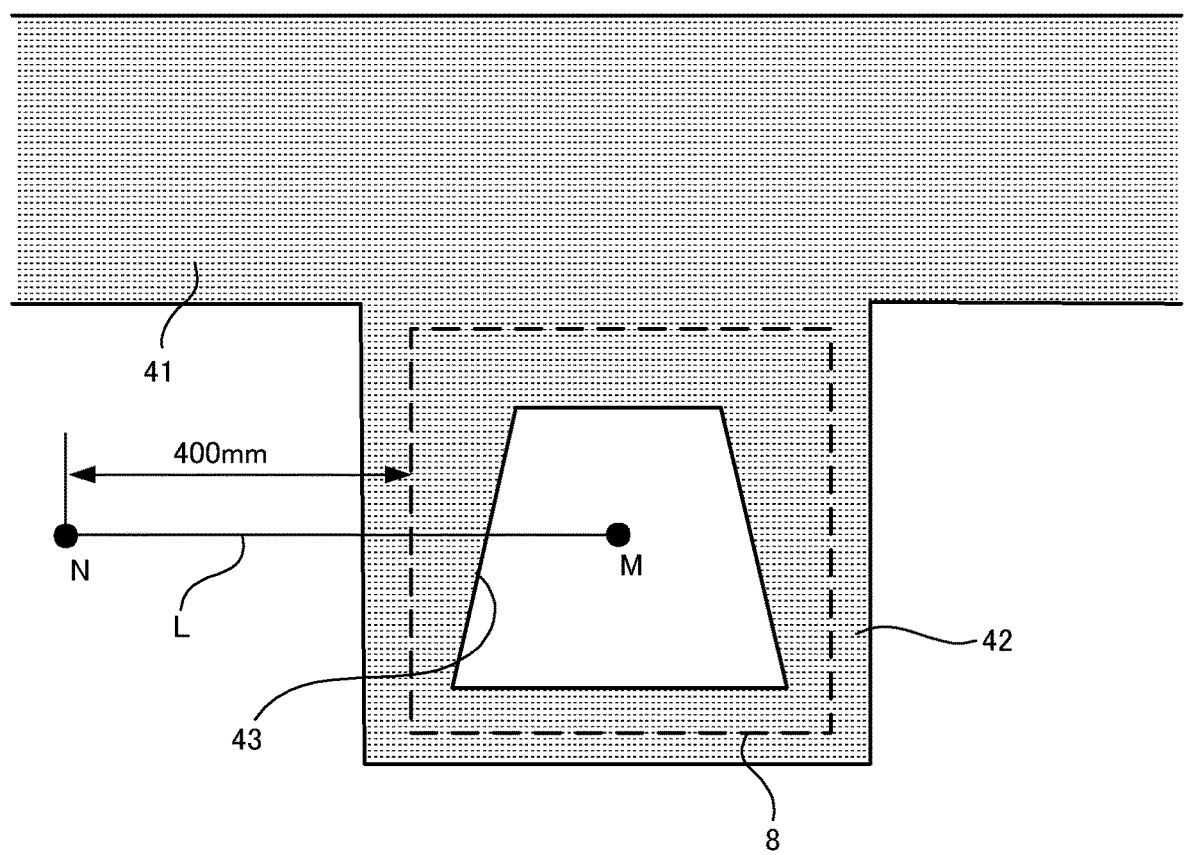
FIG. 9 is a partial plan view of the laminated glass.

First, as shown in FIG. 9, the inventor of the present invention has found that when the thickness of the windshield at the center point M of the sheet member 8 is defined as H1, and the thickness of the windshield at the point N that is 400 mm from the edge portion of the sheet member 8 on the virtual line L extending in the horizontal direction through the center point M is defined as H2, if H1 is larger than H2 (Equation (1)), there is a possibility that the sheet member will form a protruding portion on the surface of the interlayer film 5 as shown in FIG. 5.

$$H1 > H2 \tag{1}$$

That is, since the difference in thickness between the sheet member 8 and the shade region 51 (or the non-shade region 52) cannot be measured directly from the windshield after manufacture, by measuring H1 and H2 as described above, the inventor of the present invention has found that there is a possibility that there is a difference in thickness between the sheet member 8 and the shade region 51, and a protruding portion such as that described above will occur. The same applies also when a recessed portion is formed by the sheet member 8, as will be described later.

In this case, as shown in FIGS. 5 and 6, when any point A on the inner edge of the opening 43, a point B having the shortest distance from the point A on the outer edge of the sheet member 8, and a point C where a virtual line K extending from the point A through the point B and the outer edge of the extended portion 42 of the mask layer 4 intersect each other are defined, the distance between the points A and B is defined as S1, and the distance between the points B and C is defined as S2, the following equation (2) is satisfied at the location where S1+S2 is the minimum. Note that although the location where S1+S2 is minimized depends on the shape of the mask layer 4 and the shape of the sheet member 8, in the present embodiment, it is a location between the corner portion (point A) at the lower end of the opening 43 and the edge portion (point C) of the extended portion 42 of the mask layer 4.

$$S1 < S2 \tag{2}$$

As a result, in the extended portion 42, the region outside the outer edge of the sheet member 8 (the region between the point B and the point C) becomes large, and therefore the gap R is easily hidden by the mask layer 4, and it is possible to suppress a case in which this is visible from the vehicle exterior and the vehicle interior. Note that in order to satisfy equation (2), for example, the size of the sheet member 8 may be adjusted, or the width of the extended portion 42 (the length from the inner edge of the opening 43 to the outer edge of the extended portion 42) may be adjusted.

Note that as a result of study performed by the inventor of the present invention, bubbles of various widths (direction orthogonal to the outer edge of the sheet member 8) have been confirmed as the bubbles accumulated in the gap R depending on the conditions, but in order to hide them, S2 is preferably 5 mm or more, more preferably 10 mm or more, and even more preferably 20 mm or more. However, if S2 is too large, the mask layer 4 becomes large and the field of view of the windshield becomes narrow. Accordingly, S2 is preferably 50 mm or less, and more preferably 40 mm or less. From this point of view, S1+S2 is preferably 10 to 100 mm.

Also, the inventor of the present invention found that the gap R is likely to occur particularly when the following equation (3) is satisfied. Accordingly, when the following equation (3) is satisfied, it is possible to suppress a case in which the gap R is visible from the vehicle exterior, especially when equation (2) is satisfied.

$$H1 - H2 > 300 \mu m \tag{3}$$

Here, the inventor of the present invention performed a study using a laminated glass having an outer glass plate with a thickness of 2.0 mm, an inner glass plate with a thickness of 1.3 mm, and an interlayer film with a thickness of 0.76 mm (thickness other than the sheet member 8), and the results are as follows.

TABLE 2

| H1-H2 (μm) | Horizontal width of gap R (mm) | Presence or absence of bubbles |
|---|---|---|
| 350 | 10 | Many bubbles |
| 120 | 1 | Few bubbles |
| 50 | 0 | No bubbles were confirmed |
| 0 | 0 | No bubbles were confirmed |
| −50 | 0 | No bubbled were confirmed |
| −120 | 1 | Few bubbles |
| −350 | 10 | Many bubbles |

In Table 2, when H1-H2 is negative, it is thought that the thickness of the sheet member 8 is less than that of the shade region 51 (or the non-shade region 52) as shown in later-described FIG. 7. When H1-H2 is 0, it is thought that there is no level difference between the sheet member 8 and the shade region 51 (or the non-shade region 52). Accordingly, no bubbles are confirmed. Similarly, no bubbles are confirmed also when H1-H2 is 50 μm and −50 μm. That is, it is thought that the larger the absolute value of H1-H2 is, the larger the level difference is, and as a result the width of the gap R becomes larger. Also, when the width of the gap R is large, many bubbles can be seen. In particular, it has been confirmed that the bubbles become larger when the above equation (3) is satisfied.

Although a case where the protruding portion is formed on the interlayer film 5 by the sheet member 8 has been described above, a case where a recessed portion is formed in the interlayer film 5 by the sheet member 8 will be described next.

For example, as shown in FIG. 7, it was found that if the thickness of the sheet member 8 is smaller than the thickness of the shade region 51 and the non-shade region 52, the sheet member 8 forms a recessed portion in the surface of the interlayer film 5, but the outer glass plate 11 does not come into contact with the interlayer film 5 so as to absorb the recessed portion, but the outer glass plate 11 is curved along the recessed portion and the thickness is less than that of the other portions. Note that although the example of FIG. 7 shows an example in which the sheet member 8 is recessed toward the outer glass plate 11, it is also conceivable that the sheet member 8 is recessed toward the inner glass plate 12 or is recessed toward both glass plates 11 and 12.

In this case, since a level difference occurs at the boundary between the sheet member 8 and the shade region 51, there is a possibility that a gap R in which air accumulates will be formed between the outer glass plate 11 and the interlayer film 5 when the laminated glass 10 is manufactured. In this manner, when air enters the level difference, there is a risk that the appearance will deteriorate, and therefore, in the present embodiment, the following is specified.

First, as described above, when the thicknesses H1 and H2 are defined, the inventor of the present invention found that if H1 is smaller than H2 (equation (4)), there is a possibility that the sheet member 8 will form a recessed portion in the surface of the interlayer film 5 as shown in FIG. 7.

$$H1 < H2 \quad (4)$$

In this case, as shown in FIGS. 7 and 8, the above-mentioned point A, point B, point C, distance S1, and distance S2 are defined, and the following equation (5) is satisfied at the location where S1+S2 is minimized.

$$S1 > S2 \quad (5)$$

As a result, in the extended portion 42, the region where the gap R occurs (the region between the points A and B) becomes large, and therefore the gap R can be hidden by the mask layer 4 and a case in which the gap R is visible from the vehicle exterior and the vehicle interior can be suppressed. Note that in order to satisfy equation (5), for example, the size of the sheet member 8 may be adjusted, or the width of the extended portion 42 (the length from the inner edge of the opening 43 to the outer edge of the extended portion 42) may be adjusted.

As a result of the study by the inventor of the present invention, it was confirmed that the bubbles accumulated in the gap R have various widths (direction orthogonal to the outer edge of the sheet member 8) since they depend on the condition, but in order to hide them, S1 is preferably 5 mm or more, more preferably 10 mm or more, and even more preferably 20 mm or more. However, if S1 is too large, the opening 43 becomes small. Accordingly, S2 is preferably 50 mm or less, and more preferably 40 mm or less. From this viewpoint, S1+S2 is preferably 10 to 100 mm.

Also, the inventor of the present invention found that the gap R is likely to occur particularly when the following equation (6) is satisfied. Accordingly, if the following equation (6) is satisfied, it is possible to suppress a case in which the gap R is visible from the vehicle exterior, especially when equation (5) is satisfied.

$$H2-H1 > 300 \mu m \quad (6)$$

Note that in the above example, any point A at the edge portion of the opening 43 was examined, but in particular, it is preferable that the above equations (2) and (5) are satisfied in 90% or more of both lateral sides and the lower side of the opening 43, and it is more preferable that these equations are satisfied in the entire periphery.

6. Characteristics

According to the windshield described above, the following effects can be obtained.

(1) Even if the shade region 51 is formed in the interlayer film 5, the transparent sheet member 8 can be fitted in the shade region 51 to form a region through which the light of the camera of the image capture device 2 passes. Accordingly, it is possible to prevent the image capture performed by the image capture device 2 from being hindered while the shade region 51 performs shading and anti-glare.

(2) If the thickness of the sheet member 8 is different from that of the shade region 51 or the non-shade region 52, a protrusion or a recess is formed on the surface of the interlayer film 5, and therefore this causes a level difference between the sheet member 8 and the shade region (or the non-shade region 52). For this reason, if air accumulates in this level difference during the manufacture of the laminated glass, there is a risk that it will look like a bubble from the vehicle exterior and the vehicle interior. In view of this, in the present embodiment, by satisfying the above-mentioned equation (2) or equation (5), the region where the gap R is formed can be hidden by the mask layer 4, and it is possible to suppress a case in which air (bubbles) is visible from the vehicle exterior or the vehicle interior. In particular, since the shape of the mask layer 4 is often defined in advance and S1+S2 is often defined accordingly, it is significant that the above equation (2) or equation (5) is satisfied.

7. Modified Examples

Although one embodiment of the present invention has been described above, the present invention is not limited to the above-described embodiment, and various modifications can be made without departing from the gist of the present invention. Note that the following modified examples can be combined as appropriate.

7-1

The shape of the mask layer is not particularly limited, and various shapes are possible. That is, it is sufficient that at least one opening 43 for image capture is formed, and the shape of the opening is also not particularly limited. Accordingly, two or more openings may be formed.

Figure 10:
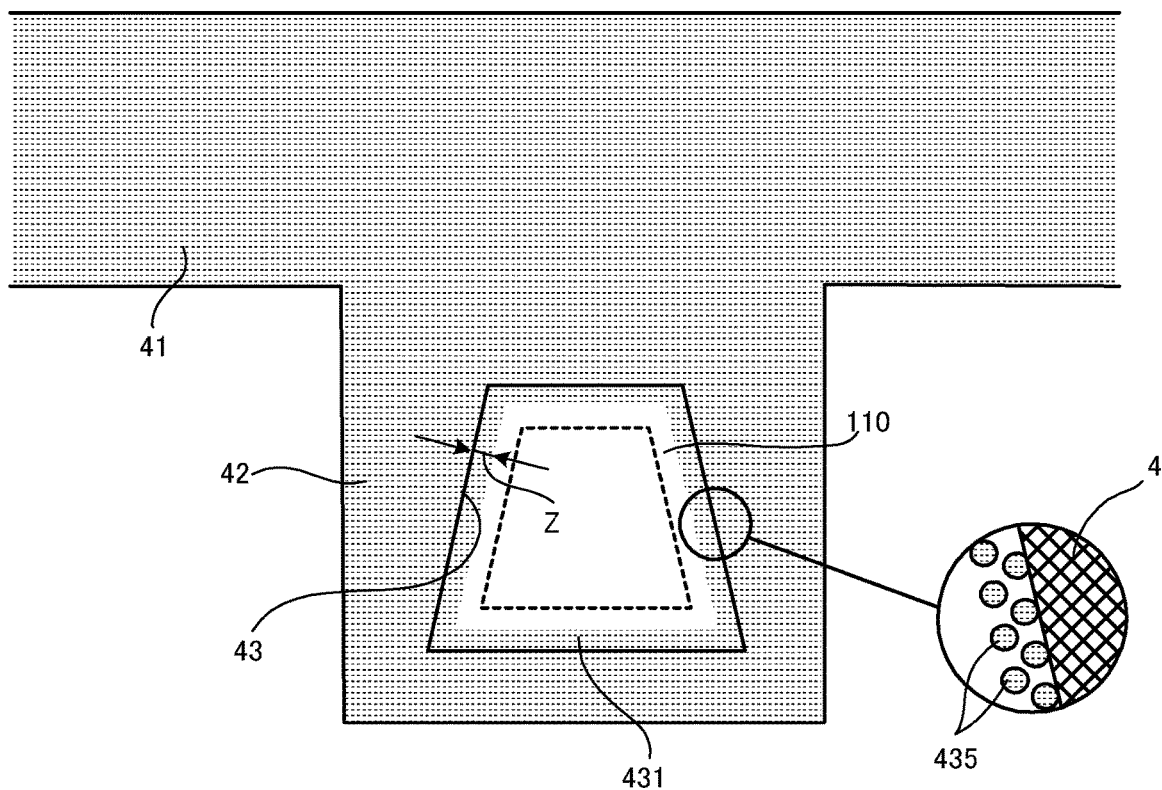
FIG. 10 is a plan view showing another example of an opening of a mask layer.

The opening can be formed, for example, as shown in FIG. 10. As shown in the drawings, in the region along the opening peripheral edge of the opening 43, an opening peripheral edge region 431 in which a plurality of circular dots (mask pieces) 435 are arranged in a staggered manner at predetermined intervals is formed (see enlarged view). That is, the opening peripheral region 431 is made of the same material (mask material) as the mask layer 4, but the density is lower relative to the percentage by which the same material as the mask layer 4 is arranged. The width of the opening peripheral region 431, that is, the distance Z from the peripheral edge of the opening 43 is preferably 4 mm or more, and more preferably 6 mm or more. Also, in the opening peripheral region 431, the percentage of the dots 435 is preferably 20 to 80%, for example. Note that the dots 435 can be made of a material different from that of the mask layer 4.

The reason for providing such an opening peripheral region 431 is as follows. First, since the coefficient of thermal expansion of the mask layer made of ceramic is different from that of glass, the amount of expansion due to heat absorption is different. For this reason, it was found that when the glass plate is heated together with the mask layer during molding of the glass plate, distortion occurs near the boundary between the mask layer and the region where the mask layer is not formed due to the difference in the amount of expansion. This causes the problem that an image seen through the glass plate is distorted.

In view of this, in the present embodiment, as described above, by forming the opening peripheral region 431 formed by the dot pattern, the thermal expansion of the opening peripheral region 431 is made smaller than that of the mask layer 4. This makes it possible to prevent the coefficient of thermal expansion from suddenly changing at the boundary between the mask layer 4 (edge portion of the opening) and the inside of the opening. That is, the density of the ceramic shifts from the mask layer 4 (the edge portion of the opening) where the density of the ceramic is high to the inside of the opening where the ceramic is not formed, through the opening peripheral region 431 where the density of the ceramic is low, and therefore the change in the amount of thermal expansion becomes gradual, and therefore it is possible to suppress a case in which distortion occurs in the glass plates 11 and 12 near the boundary of the opening 43. For this reason, it is possible to suppress the occurrence of distortion in the image acquired by the image capture device 2.

In the example of FIG. 10, the opening peripheral region 431 is formed by a staggered dot pattern, but a rectangular shape, a polygonal shape, an irregular shape, or the like other than a circular shape may be used as long as the density of the ceramic can be reduced, and these can be arranged in a staggered manner or at predetermined intervals. Also, the size of the dots 435 may be changed. Also, linear patterns can be formed at predetermined intervals. In addition, the opening peripheral region can be formed by arranging mask pieces of various shapes at predetermined intervals. For example, the size and shape of the dots can be changed, or the shape of the periphery of the opening can be curved instead of straight.

Note that in the outer glass plate 11 and the inner glass plate 12 on which the mask layer 4 is laminated, a region approximately 4 to 6 mm inward from the inner peripheral edge of the opening peripheral edge region 431 is a distortion region 110 in which distortion may occur, although it is slightly different depending on the heating step and the slow cooling step (the region inside the distortion region 110 corresponds to the central region of the present invention). In the example of FIG. 10, the inner edge of the distortion region 110 is shown by a dotted line. Accordingly, it is preferable to acquire an image by an image capture device further inward relative to the distortion region 100. Note that if the width of the distortion region 110 is set to be large, the central region for acquiring a captured image becomes narrow, and therefore the width of the distortion region 110 is preferably set within 6 mm.

7-2

In the above embodiment, the mask layers 4 of the outer glass plate 11 and the inner glass plate 12 have the same shape and are formed at the same position, but there is no limitation to this. That is, the shapes of the two mask layers 4 do not need to be exactly the same as long as an image can be captured by the image capture device 2 through each opening 43 of the two mask layers 4. Also, since the laminated glass 10 is installed at an inclination, the position of the opening 43 can be slightly shifted even if the position of the opening 43 is adjusted to the inclination. Also, for example, either mask layer can be made into only one of the peripheral edge portion 41 and the extended portion 42.

7-3

In the above embodiment, the mask layer 4 is formed on both the surface on the vehicle interior side of the outer glass plate 11 and the surface on the vehicle interior side of the inner glass plate 12, but either one may be used. However, for example, if the mask layer 4 is formed on the surface on the vehicle exterior side of the outer glass plate 11, the above-mentioned air may be visually recognized from the vehicle interior.

7-4

The shape of the sheet member 8 is not particularly limited, and need only be formed at least larger than the opening 43. Also, the position where the sheet member 8 is arranged is not particularly limited, and need only be a position that at least partially overlaps with the shade region 51.

7-5

Figure 11:
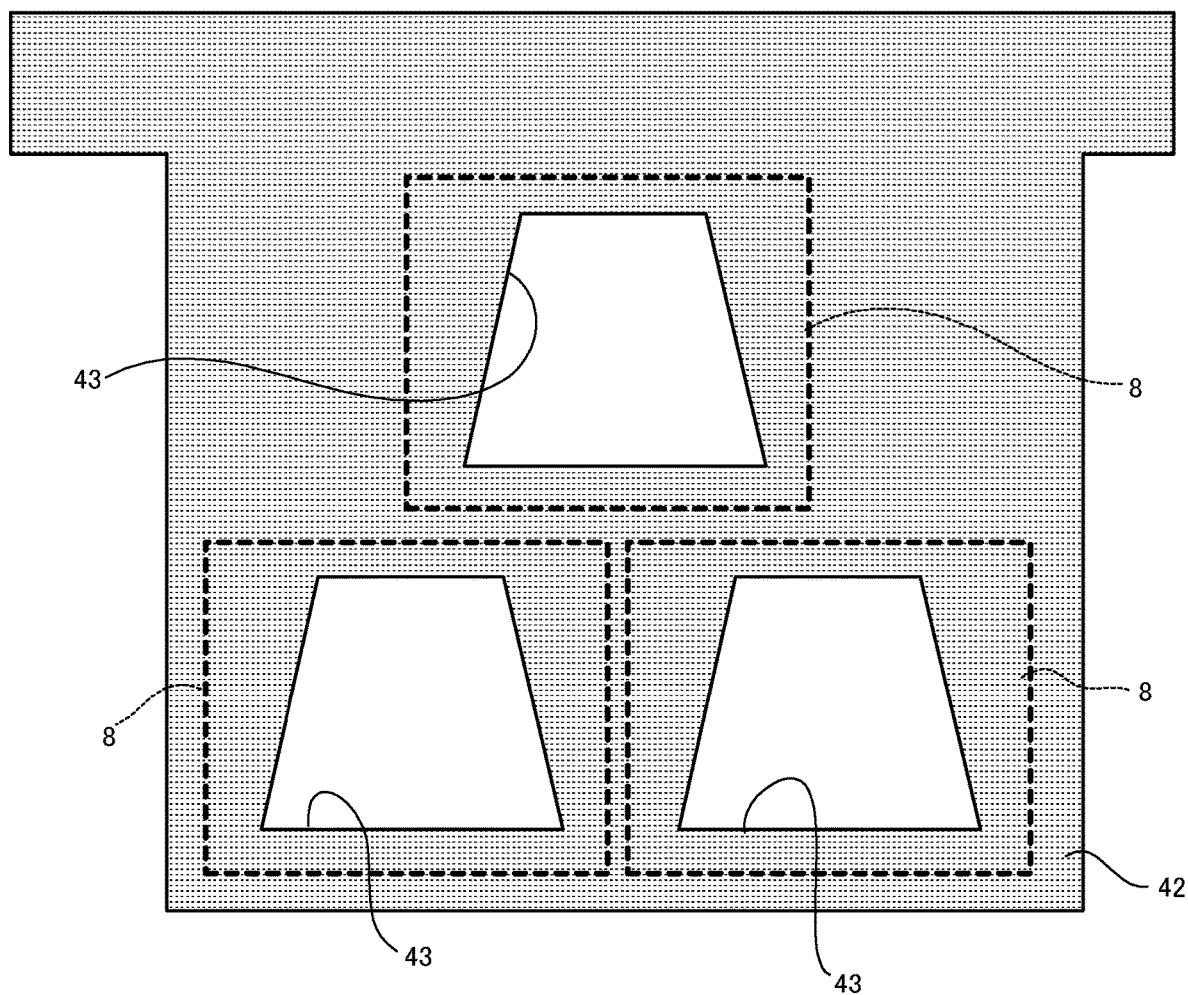
FIG. 11 is a plan view showing another example of an opening of a mask layer.

A plurality of openings 43 of the mask layer 4 can also be formed. For example, as shown in FIG. 11, a plurality of openings 43 can be formed in the extended portion 42 of the mask layer 4, through holes 50 can be formed in the interlayer film 5 so as to correspond to the openings 43, and the sheet members 8 can be fitted into the through holes 50. In this case, a plurality of cameras, sensors, and the like are arranged so as to correspond to each opening 43.

Figure 12:
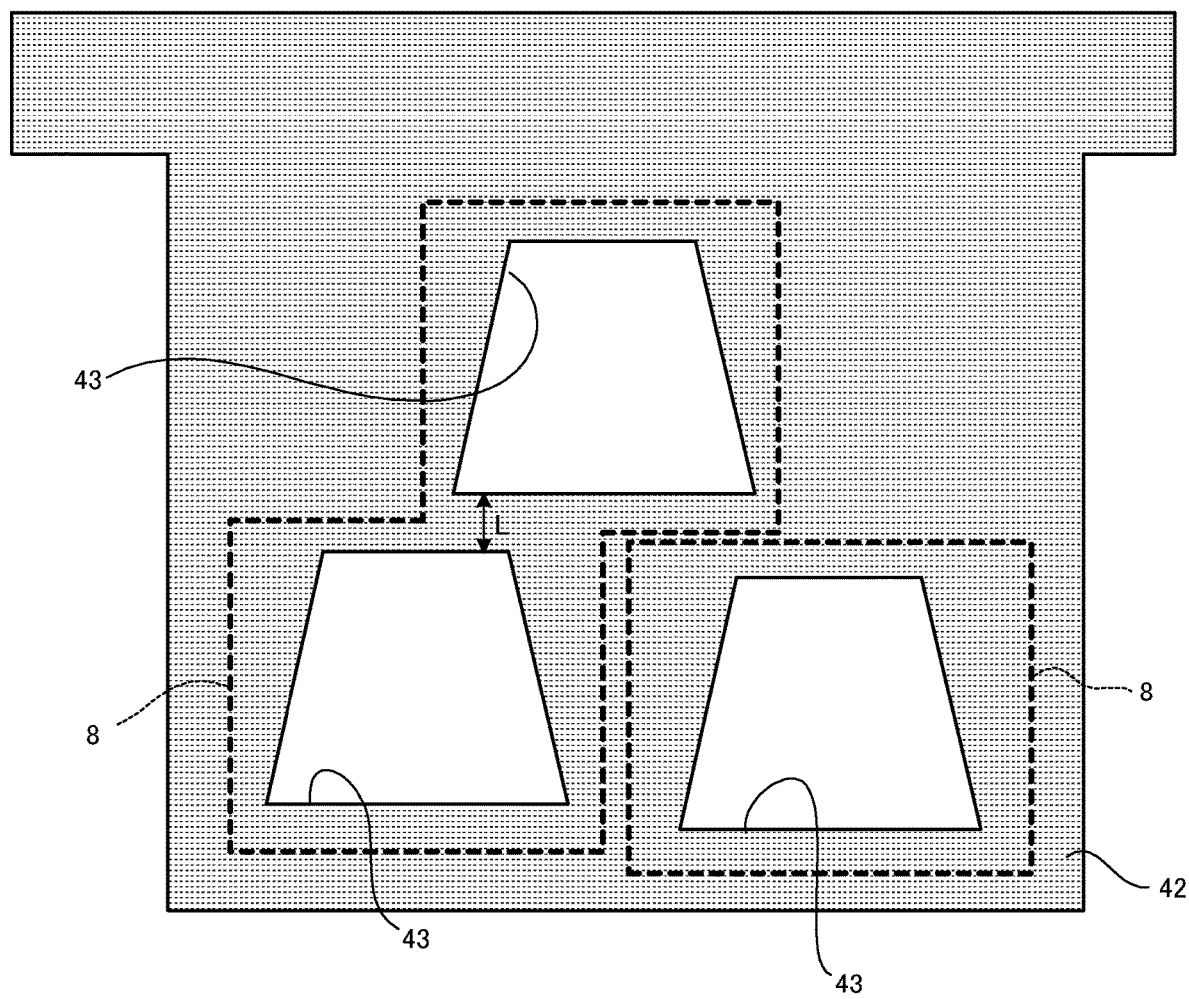
FIG. 12 is a plan view showing another example of an opening of a mask layer.

Note that as shown in FIG. 12, if adjacent openings 43 are close to each other, for example, if the shortest distance L between the adjacent openings 43 is shorter than twice S2 (S2 defined between the adjacent openings) corresponding to each opening 43, the adjacent sheet members 8 can be formed so as to be integrated with each other.

Figure 13:
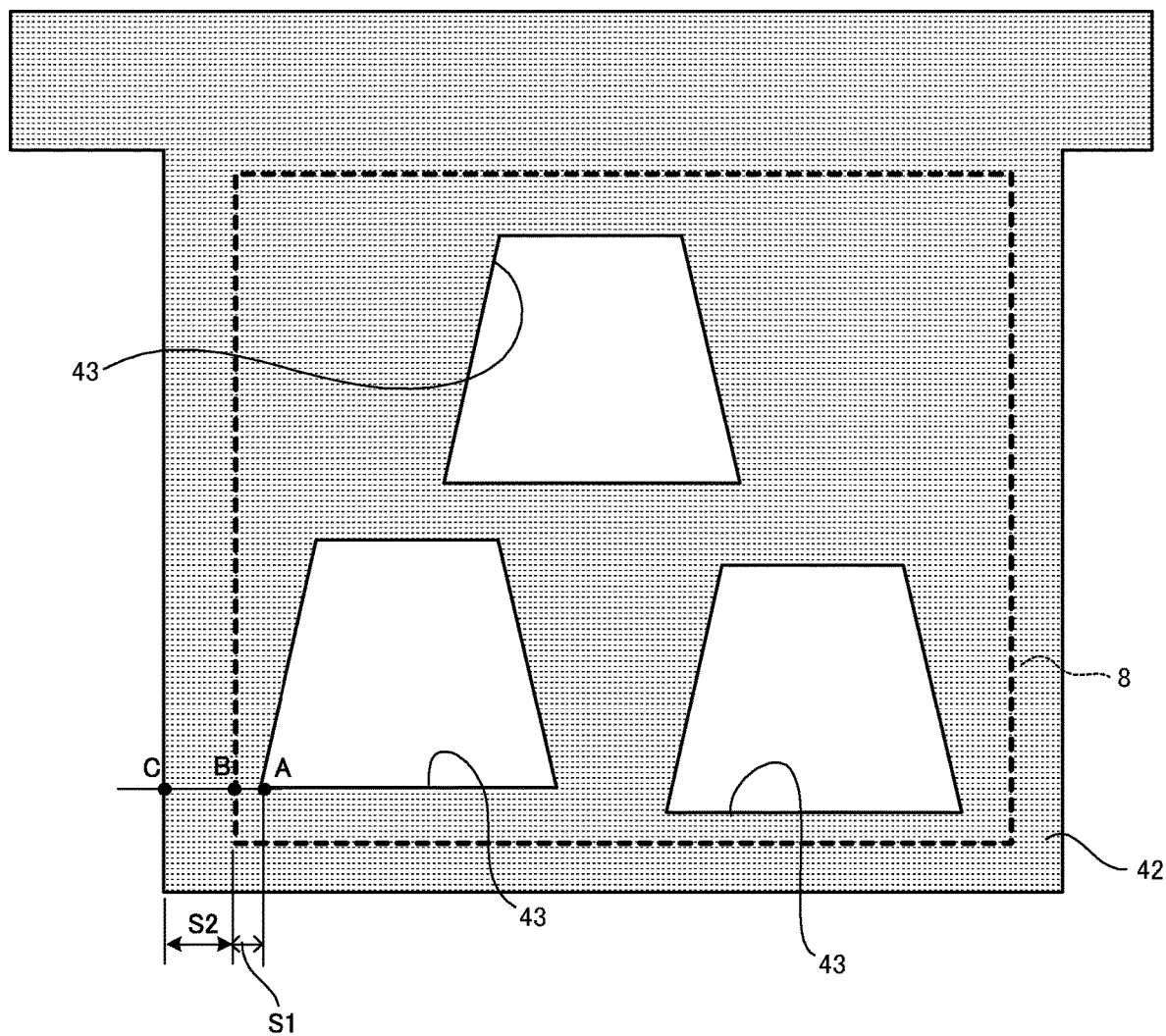
FIG. 13 is a plan view showing another example of an opening of a mask layer.

Also, as shown in FIG. 13, all of the plurality of openings 43 can be arranged in the inner portion of the sheet member 8. In this case, each of the above equations can be satisfied in the opening 43 arranged near the outer edge of the sheet member 8. Note that as specific numerical values, for example, S1 in FIG. 13 can be less than 6 mm and S2 can be 6 mm or more. Also, the sheet material can be increased to a size of, for example, 400 mm horizontally×300 mm vertically. In this case, it is sufficient that the above equation (2) or (5) is satisfied at the location where S1+S2 is the smallest among all of the openings 43.

7-6

In the above embodiment, an image capture device was used as the information acquisition device of the present invention, but there is no limitation to this, and various information acquisition devices can be used. That is, there is no particular limitation as long as the image capture device emits and/or receives light in order to acquire information from the outside of the vehicle. For example, the present invention can be applied to various devices, such as a sensor for measuring the distance between vehicles, a visible light and/or infrared camera for measuring the distance between vehicles, a light receiving device for receiving a signal from outside the vehicle such as an optical beacon, or a camera that uses visible light and/or infrared for reading a white line on a road in an image, or the like. Also, the number of openings in the mask layer 4 can be changed as appropriate according to the type of the information acquisition device. For example, emission and reception of light can be performed through dedicated openings. Note that the information acquisition device may or may not be in contact with the glass plate. In any case, in the glass plate, a heating wire is formed in a region (information acquisition region) through which the light of the information acquisition device passes.

7-7

In the present invention, the laminated glass can be configured as follows according to the information acquisition device.

1. When using a camera system that operates in the visible range, the light transmittance of an A light source of the laminated glass can be set to less than 70%. When the light transmittance of the A light source of the laminated glass is less than 70% as described above, the following laminated glass is used. Note that the A light source is one of the three types of standard light sources A, B, and C specified by the agreement of the International Commission on Illumination CIE, and the A light source is an ordinary gas-filled tungsten incandescent bulb with a color temperature of 2854 K.
(i) The intermediate layer (e.g., PVB) can be darkly colored (e.g., the outer glass plate 11 and the inner glass plate 12 can be clear glass).
(ii) The content of $Fe_2O_3$ in each of the glass plates 11 and 12 that are clear glass can be, for example, 0.01 to 0.2 wt %. Alternatively, a combination of colored glass with a $Fe_2O_3$ content of 0.5 wt to 1 wt %, or a combination of colored glass with a $Fe_2O_3$ content of 0.5 to 1.5 wt % and clear glass with a $Fe_2O_3$ content of usually 0.01 to 0.2 wt % can be used.
(iii) The thickness of the laminated glass is 3 to 9 mm (the thickness of each glass plate 11 and 12 can be 0.7 to 4 mm).
(iv) A sheet member 8 larger than the opening 43 is used.
(v) This laminated glass can be used for a windshield on a front side or rear glass on a rear side.

2. When using a LiDAR system, the light transmittance of the A light source of the laminated glass can be set to less than 70%. When the light transmittance of the A light source of the laminated glass is less than 70%, the following laminated glass is used.
(i) The intermediate layer (e.g., PVB) is darkly colored (the outer glass plate 11 and the inner glass plate 12 are preferably ultra-clear glass).
(ii) The content of $Fe_2O_3$ in each of the glass plates 11 and 12, which are ultra-clear glass, is, for example, less than 0.1 wt % and preferably less than 0.05 wt %.
(iii) The thickness of the laminated glass is 3 to 9 mm (the thickness of each glass plate 11 and 12 can be 0.7 to 4 mm).
(iv) A sheet member 8 larger than the opening 43 is used.
(v) This laminated glass can be used for a windshield on a front side or rear glass on a rear side.

3. When using a LiDAR system, the light transmittance of the A light source of the laminated glass can exceed 70%. When the light transmittance of the A light source of the laminated glass exceeds 70%, the following laminated glass is used.
(i) The intermediate layer (e.g., PVB) provides solar light control properties by absorption (Tts can be, for example, less than 65%, preferably less than 60%, and more preferably less than 55%).
(ii) The outer glass plate 11 and the inner glass plate 12 can be made of ultra-clear glass (the content of $Fe_2O_3$ is, for example, less than 0.1 wt %, and preferably less than 0.05 wt %).
(iii) The thickness of the laminated glass is 3 to 9 mm (the thickness of each glass plate 11 and 12 can be 0.7 to 4 mm).
(iv) A sheet member 8 larger than the opening 43 is used.
(v) This laminated glass can be used for a windshield on a front side or rear glass on a rear side.

Note that Tts can be calculated by measuring the transmittance/reflectance at wavelengths of 300 nm to 2500 nm using a spectrophotometer ("U-4100" manufactured by Hitachi High-Tech) in accordance with ISO 13837. From the viewpoint of further improving the heat shielding property, Tts is preferably 70% or less, more preferably 65% or less, and still more preferably 60% or less.

7-8

In the above embodiment, the laminated glass of the present invention was used as a windshield, but other than this, it can also be used for rear glass, side glass, and the like. Alternatively, it can be used also for vehicles other than automobiles (trains, etc.).

LIST OF REFERENCE NUMERALS

10 Laminated glass
11 Outer glass plate
12 Inner glass plate
2 Image capture device (information acquisition device)

4 Mask layer
43 Opening (information acquisition region)
5 Interlayer film
51 Shade region
52 Non-shade region
8 Sheet member

The invention claimed is:

1. A laminated glass on which an information acquisition device for acquiring information from outside of a vehicle by emitting and/or receiving light is arrangeable, the laminated glass comprising:
    an outer glass plate;
    an inner glass plate;
    an interlayer film arranged between the outer glass plate and the inner glass plate; and
    a mask layer laminated on at least one of a surface on a vehicle interior side of the outer glass plate or a surface on a vehicle interior side of the inner glass plate,
    wherein the interlayer film includes:
        a colored shade region;
        a transparent non-shade region; and
        a transparent sheet member fitted into at least one through hole formed over the shade region and the non-shade region,
    the mask layer includes at least one opening that is formed on an inner side relative to an edge portion of the sheet member at a position corresponding to the sheet member,
    the light of the information acquisition device passes through the opening,
    when a thickness between an outer surface of the outer glass plate and an inner surface of the inner glass plate at a central point of the sheet member is defined as H1, a thickness between the outer surface of the outer glass plate and the inner surface of the inner glass plate at a point that is 400 mm away from the edge portion of the sheet member on a virtual line extending in a horizontal direction through the central point is defined as H2, and
    any point A on an inner edge of the opening, a point B that is the shortest distance from the point A on an outer edge of the sheet member, and a point C at which a virtual line extending from the point A through the point B and an outer edge of the mask layer intersect each other,
    a distance between the point A and the point B is defined as S1, and a distance between the point B and the point C is defined as S2,
    when H1 is greater than H2, S1 is smaller than S2 at a location where S1+S2 is minimized,
    when H1 is less than H2, S1 is greater than S2 at a location where S1+S2 is minimized, and
    |H1-H2|≥120 μm.

2. The laminated glass according to claim 1, wherein when H1 is greater than H2, the distance S2 is 5 to 50 mm.

3. The laminated glass according to claim 1, wherein when H1 is less than H2, the distance S1 is 5 to 50 mm.

4. The laminated glass according to claim 2, wherein S1+S2 is 100 mm or less.

5. The laminated glass according to claim 1, wherein
    a plurality of the openings is formed, and
    when the shortest distance between the openings that are adjacent to each other is smaller than the sum of the S2 of the openings, the sheet members corresponding to the openings are formed integrally with each other.

6. The laminated glass according to claim 1, wherein
    a mask material forming the mask layer and the glass plate have different thermal expansion rates, the glass plate and the mask layer are formed by being heated together,
    an opening peripheral edge region in which a percentage by which the mask layer is arranged per unit surface area is low is formed in at least a partial region along an inner peripheral edge of the opening of the mask layer, and
    the light passes through a region on an inner side relative to the opening peripheral edge region.

7. The laminated glass according to claim 6, wherein the opening peripheral edge region is formed over the entirety of the inner peripheral edge of the opening.

8. The laminated glass according to claim 6, wherein
    an inner portion of the opening peripheral edge region of the laminated glass is constituted by a distortion region along an inner peripheral edge of the opening peripheral edge region and a central region adjacent to an inner side of the distortion region, and
    the light passes through all or a portion of the central region.

9. The laminated glass according to claim 6, wherein
    the opening peripheral edge region includes a plurality of mask pieces made of the mask material, and
    the plurality of mask pieces is arranged at intervals from each other.

10. The laminated glass according to claim 9, wherein each mask piece is formed in a circular shape.

11. The laminated glass according to claim 6, wherein an electromagnetic wave blocking film is formed in at least a portion of the region where the information acquisition device is attached in the mask layer, the opening peripheral edge region, and the distortion region.

12. The laminated glass according to claim 11, wherein at least a portion of the mask layer, the opening peripheral edge region, and the distortion region is formed by arranging a first field-of-view blocking film, the electromagnetic wave blocking film, and a second field-of-view blocking film in the stated order from a vehicle exterior side to a vehicle interior side.

13. The laminated glass according to claim 1, wherein the sheet member is larger than a square with 100 mm sides, and is smaller than a square with 300 mm sides.

14. The laminated glass according to claim 1, wherein the interlayer film is constituted by a plurality of layers.

15. The laminated glass according to claim 14, wherein
    the interlayer film includes at least a core layer and a pair of outer layers sandwiching the core layer, and
    the Young's modulus of the core layer is 20 MPa or less at 20° C. and 100 Hz.

16. The laminated glass according to claim 1, wherein two to four of the through holes are formed, and the sheet member is fitted into each of the through holes.

17. The laminated glass according to claim 1, wherein a cross-section taken in a vertical direction is formed in a wedge shape.

18. The laminated glass according to claim 1, wherein the thickness of the outer glass plate is less than the thickness of the inner glass plate.

19. The laminated glass according to claim 1, which is used as a windshield.

20. The laminated glass according to claim 1, which is used as a rear glass.

21. The laminated glass according to claim 1, wherein the thickness of the transparent sheet member is different from the depth of the through hole of the interlayer film.

22. The laminated glass according to claim 1, wherein $|H1-H2|<300$ μm.

* * * * *